US010708071B1

(12) United States Patent
Greco et al.

(10) Patent No.: US 10,708,071 B1
(45) Date of Patent: *Jul. 7, 2020

(54) CONSENSUS PROTOCOLS IN DISTRIBUTED COMPUTING SYSTEMS

(71) Applicant: Protocol Labs, Inc., San Francisco, CA (US)

(72) Inventors: Nicola Greco, Cambridge, MA (US); Juan Batiz-Benet, Palo Alto, CA (US); David Allen Dalrymple, Las Vegas, NV (US)

(73) Assignee: Protocol Labs, Inc., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/195,536

(22) Filed: Nov. 19, 2018

Related U.S. Application Data

(60) Provisional application No. 62/697,123, filed on Jul. 12, 2018, provisional application No. 62/697,091, (Continued)

(51) Int. Cl.
*H04L 9/32* (2006.01)
*H04L 9/06* (2006.01)
(Continued)

(52) U.S. Cl.
CPC .......... *H04L 9/3271* (2013.01); *G06F 16/134* (2019.01); *H04L 9/0637* (2013.01); *H04L 9/0643* (2013.01); *H04L 2209/38* (2013.01)

(58) Field of Classification Search
CPC ..... H04L 9/08; H04L 63/0428; H04L 9/3271; H04L 9/0637; H04L 9/0643; G06F 16/134
See application file for complete search history.

(56) References Cited

U.S. PATENT DOCUMENTS 8,799,334 B1  8/2014  Stefanov
8,984,384 B1  3/2015  Juels
(Continued)

OTHER PUBLICATIONS

Marko Vukolic, The Quest for Scalable Blockchain Fabric: Proof-of-Work vs. BFT Replication, IBM Research—Zurich (Year: 2015).*
(Continued)

*Primary Examiner* — Shanto Abedin
(74) *Attorney, Agent, or Firm* — Fish & Richardson P.C.

(57) ABSTRACT

One method includes: (a) forwarding an input challenge to a prover at a start time, the input challenge having a time-stamp; (b) receiving a proof of storage responsive to the input challenge from the prover; (c) generating a new input challenge based on the proof of storage and forwarding the new input challenge to the prover; (d) repeating steps (b) and (c) resulting in a final proof; (e) receiving a proof result based on the final proof, the proof result having a time-stamp; (f) determining that the time between the start time time-stamp and the proof result time-stamp is less than a specified period of time; and (g) determining a winning prover from a plurality of candidate provers where a probability of a candidate prover being a winning prover is proportional to the candidate prover's assigned storage which is indicated at least in part by the candidate miner's proof result.

18 Claims, 17 Drawing Sheets

Related U.S. Application Data filed on Jul. 12, 2018, provisional application No. 62/697,097, filed on Jul. 12, 2018.

(51) Int. Cl.
  *H04L 29/06* (2006.01)
  *G06F 21/60* (2013.01)
  *G06F 16/13* (2019.01)

(56) References Cited

U.S. PATENT DOCUMENTS

| | | | |
|---|---|---|---|
| 10,250,708 B1* | 4/2019 | Carver | H04L 67/12 |
| 2006/0112273 A1 | 5/2006 | Tuyls | |
| 2010/0122093 A1 | 5/2010 | Tuyls | |
| 2010/0205443 A1 | 8/2010 | Zhao | |
| 2011/0119481 A1 | 5/2011 | Auradkar | |
| 2013/0279697 A1 | 10/2013 | Garcia | |
| 2017/0005804 A1* | 1/2017 | Zinder | H04L 9/3247 |
| 2018/0025166 A1* | 1/2018 | Daniel | G06Q 10/06 713/189 |
| 2018/0053182 A1* | 2/2018 | Mokhasi | G06Q 20/3829 |
| 2018/0077122 A1 | 3/2018 | Hoss | |
| 2018/0109541 A1* | 4/2018 | Gleichauf | H04W 12/10 |
| 2018/0152513 A1 | 5/2018 | Bohli | |
| 2018/0322561 A1* | 11/2018 | Arora | G06Q 30/0633 |
| 2018/0336552 A1* | 11/2018 | Bohli | G06Q 20/389 |
| 2018/0337769 A1* | 11/2018 | Gleichauf | H04L 9/3239 |
| 2019/0182029 A1* | 6/2019 | Yim | H04L 9/0637 |
| 2019/0303622 A1* | 10/2019 | Versteeg | G06F 21/64 |
| 2019/0318129 A1* | 10/2019 | David | G06F 16/252 |
| 2019/0334912 A1* | 10/2019 | Sloane | H04L 63/12 |

OTHER PUBLICATIONS

Benet et al., "Proof of Replication Technical Report (WIP)", Protocol Labs, Jul. 27, 2017.

No Author Listed, "Filecoin: A Decentralized Storage Network", Protocol Labs, Jan. 2, 2018.

No Author Listed, "Filecoin: A Decentralized Storage Network", Protocol Labs, Jul. 19, 2017.

Curtnnola et al., "MR-PDP: Multiple-Replica Provable Data Possession", 28th International Conference on Distributed Computing Systems, 2008, pp. 411-420. (Year: 2008).

Dziennbowski et al., "Proofs of Space", pp. 1-31 (Year: 2015).

Moran et al., "Simple Proofs of Space-Time and Rational Proofs of Storage", 23 pages (Year: 2019).

\* cited by examiner

Filecoin Protocol Sketch

Network at each epoch $t$ in the ledger $\mathcal{L}$:

1. for each new block:
   (a) check if the block is in the valid format
   (b) check if all transactions are valid
   (c) check if all orders are valid
   (d) check if all proofs are valid
   (e) check if all pledges are valid
   (f) discard block, if any of the above fails
2. for each new order $O$ introduced in $t$:
   (a) add $O$ to the Storage Market's orderbook
   (b) if $O$ is a bid: lock $O$.funds
   (c) if $O$ is an ask: lock $O$.space
   (d) if $O$ is a deal: run Put.AssignOrders
3. for each $O$ in the Storage Market's orderbook:
   (a) check if $O$ has expired (or canceled):
     - remove $O$ from the orderbook
     - return unspent $O$.funds
     - free $O$.space from AllocTable
   (b) if $O$ is a deal, check if the expected proofs exist by running Manage.RepairOrders:
     - if one missing, penalize the $\mathcal{M}$'s pledge collateral
     - if proofs are missing for more than $\Delta_{\text{fault}}$ epochs, cancel order and re-introduce it to the market
     - if the piece cannot be retrieved and reconstructed from the network, cancel order and re-fund the client

Client at any time:

1. submit new storage orders via Put.AddOrders
   (a) find matching orders via Put.MatchOrders
   (b) send file to the matched miner $\mathcal{M}$
2. submit new retrieval orders via Get.AddOrders
   (a) find matching orders via Get.MatchOrders
   (b) create a payment channel with $\mathcal{M}$ on receiving $O_{\text{ask}}$ from Storage Miners $\mathcal{M}$:

1. sign $O_{\text{ask}}$
2. submit the signed $O_{\text{ask}}$ to the blockchain via Put.AddOrders on receiving $(p_i)$ from Retrieval Miners $\mathcal{M}$:

1. verify that $(p_i)$ is valid and it was requested
2. send a micropayment to $\mathcal{M}$

Storage Mine at any time:

1. renew expired pledges via Manage.PledgeSector
2. pledge new storage via Manage.PledgeSector
3. submit a new ask order via Put.AddOrder at each epoch $t$:

1. for each $O_{\text{bid}}$ in the orderbook:
   (a) find matched orders via Put.MatchOrders
   (b) start a new deal by contacting the matching client
2. for each sector pledged:
   (a) generate proof of storage via Manage.ProveSector
   (b) if time to post the proof (every $\Delta_{\text{proof}}$ epochs), submit it to the blockchain on receiving piece $p$ from client $C$:

1. check if the piece is of the size specified in the order $O_{\text{ask}}$
2. create $O_{\text{deal}}$ and sign it and send it to $C$
3. store the piece in a sector
4. if the sector is full, run Manage.SealSector

Retrieval Mine at any time:

1. gossip ask orders to the network
2. listen to bid orders from the network on retrieval request from $C$:

1. start payment channel with $C$
2. split data in multiple parts
3. only send parts if payments are received

FIG. 1B

```
Filecoin PoRep protocol                          Filecoin PoSt protocol
Setup                                            Setup
 • INPUTS:                                        • INPUTS:
    – prover key pair (pk_P, sk_P)                  – prover key pair (pk_P, sk_P)
    – prover SEAL key pk_SEAL                       – prover POST key pair pk_POST
    – data D                                        – some data D
 • OUTPUTS: replica R, Merkle root rt of R,       • OUTPUTS: replica R, Merkle root rt of R,
   proof π_SEAL                                     proof π_SEAL
 1) Compute h_D := CRH(D)                         1) Compute R, rt, π_SEAL := PoRep.Setup(pk_P,
 2) Compute R := Seal'(D, sk_P)                      sk_P, pk_SEAL, D)
 3) Compute rt := MerkleCRH(R)                    2) Output R, rt, π_SEAL
 4) Set x⃗ := (pk_P, h_D, rt)
 5) Set a⃗ := (sk_P, D)                           Prove
 6) Compute π_SEAL := SCIP.Prove(pk_SEAL, x⃗, a⃗)   • INPUTS:
 7) Output R, rt, π_SEAL                             – prover PoSt key pk_POST
                                                     – replica R
Prove                                                – random challenge c
 • INPUTS:                                           – time parameter t
    – prover Proof-of-Storage key pk_POS          • OUTPUTS: a proof π_POST
    – replica R                                   1) Set π_POST := ⊥
    – random challenge c                          2) Compute rt := MerkleCRH(R)
 • OUTPUTS: a proof π_POS                         3) For i := 0..t:
 1) Compute rt := MerkleCRH(R)                       a) Set c' := CRH(π_POST ‖ c ‖ i)
 2) Compute path := Merkle path from rt to leaf R_c  b) Compute π_POS := PoRep.Prove(pk_POS, R, c')
 3) Set x⃗ := (rt, c)                                c) Set x⃗ := (rt, c, i)
 4) Set a⃗ := (path, R_c)                            d) Set a⃗ := (π_POS, π_POST)
 5) Compute π_POS := SCIP.Prove(pk_POS, x⃗, a⃗)       e) Compute π_POST := SCIP.Prove(pk_POST, x⃗, a⃗)
 6) Output π_POS                                  4) Output π_POST Verify                                           Verify
 • INPUTS:                                        • INPUTS:
    – prover public key pk_P                        – prover public key pk_P
    – verifier SEAL and POS keys vk_SEAL, vk_POS    – verifier SEAL and POST keys vk_SEAL, vk_POST
    – hash of data D, h_D                           – hash of some data h_D
    – Merkle root of replica R, rt                  – Merkle root of some replica rt
    – random challenge, c                           – random challenge c
    – tuple of proofs, (π_SEAL, π_POS)              – time parameter t
 • OUTPUTS: bit b, equals 1 if proofs are valid     – tuple of proofs (π_SEAL, π_POST)
 1) Set x⃗_1 := (pk_P, h_D, rt)                   • OUTPUTS: bit b, equals 1 if proofs are valid
 2) Compute b_1 := SCIP.Verify(vk_SEAL, x⃗_1, π_SEAL) 1) Set x⃗_1 := (pk_P, h_D, rt)
 3) Set x⃗_2 := (rt, c)                           2) Compute b_1 := SCIP.Verify(vk_SEAL, x⃗_1, π_SEAL)
 4) Compute b_2 := SCIP.Verify(vk_POS, x⃗_2, π_POS) 3) Set x⃗_2 := (rt, c, t)
 5) Output b_1 ∧ b_2                              4) Compute b_2 := SCIP.Verify(vk_POST, x⃗_2, π_POST)
                                                  5) Output b_1 ∧ b_2
```

FIG. 4

Data Structures

Pledge
pledge := (size, coll)$_{\mathcal{M}_1}$

- size, the size of the sector being pledged.
- coll, the collateral specific to this pledge that $\mathcal{M}_1$ deposits.

Orderbook
OrderBook: $(O^1..O^n)$

- $O^i$, currently valid *deal*, *ask*, *bid* orders.

Allocation
allocTable: $\{\mathcal{M}_1 \rightarrow$ (allocEntry..allocEntry), $\mathcal{M}_2...\}$ allocEntry: (sid, orders, last, missing)

- sid, sector id
- $O^i$, currently valid *deal*, *ask*, *bid* orders.
- orders, set of orders $\{O_{deal}..O_{deal}\}$
- last, last proof of storage in the ledger $\mathcal{L}$
- missing, counter for missing proofs

FIG. 5

| | Client | Network | Miner |
|---|---|---|---|
| Put | AddOrders(..,$O_{bid}$)<br>SendPiece(..,$O_{bid}$, $p$)<br>AddOrders($O_{deal}$) | MatchOrders(..) | AddOrders(..,$O_{ask}$)<br>ReceivePiece(..,$O_{ask}$)<br>AddOrders(..,$O_{deal}$) |
| Get | AddOrder(..,$O_{bid}$)<br>ReceivePiece(..,$O_{bid}$)<br>AddOrders(..,$O_{deal}$) | MatchOrders(..) | AddOrder(..,$O_{ask}$)<br>SendPiece(..,$O_{ask}$, $p$)<br>AddOrders(..,$O_{deal}$) |
| Manage | | AssignOrders(..,$O_{deal}$)<br>RepairOrders(..) | PledgeSector()<br>SealSector(..)<br>ProveSector(..) |

FIG. 6

Put Protocol

Market
AddOrders
- INPUTS: list of orders $O^1...O^n$
- OUTPUTS: bit $b$, equals 1 if successful
1) Set $tx_{order} = (O^1...O^n)$
2) Submit $tx_{order}$ to $\mathcal{C}$
3) Wait for $tx_{order}$ to be included in $\mathcal{C}$
4) Output 1 on success, 0 otherwise MatchOrders
- INPUTS:
  - the current Storage Market OrderBook
  - query order to match $O^q$
- OUTPUTS: matching orders $O^1...O^n$
1) Match each $O^i$ in OrderBook such that:
   a) If $O^q$ is an ask order:
      i) Check if $O^i$ is bid order
      ii) Check $O^i.price \geq O^q.price$
      iii) Check $O^i.size \leq O^q.space$
   b) If $O^q$ is a bid order:
      i) Check if $O^i$ is ask order
      ii) Check $O^i.price \leq O^q.price$
      iii) Check $O^i.space \geq O^q.size$
2) Output matched orders $O^1...O^n$ Exchange
SendPiece
- INPUTS:
  - an ask order $O_{ask}$
  - a bid order $O_{bid}$
  - a piece $p$
- OUTPUTS: a deal order $O_{deal}$ signed by $M_j$
1) Get identity of $M_j$ from $O_{ask}$ signature
2) Send $(O_{ask}, O_{bid}, p)$ to $M_j$
3) Receive $O_{deal}$ signed by $M_j$
4) Check if $O_{deal}$ is valid according to Definition
5) Output $O_{deal}$ ReceivePiece
- INPUTS:
  - signing key for $M_j$
  - current orderbook OrderBook
  - ask order $O_{ask}$
  - bid order $O_{bid}$
  - piece $p$
- OUTPUTS: deal order $O_{deal}$ signed by $C_i$ and $M_j$
1) Check if $O_{bid}$ is valid:
   a) Check if $O_{bid}$ is in OrderBook
   b) Check if $O_{bid}$ is not referenced by other active $O_{deal}$
   c) Check if $O_{bid}.size$ is equal to $|p|$
   d) Check if $O^i$ is signed by $M_j$
2) Store $p$ locally
3) Set $O_{deal} = (O_{ask}, O_{bid}, H(p), M_j)$
4) Get identity of $C_i$ from $O_{bid}$
5) Send $O_{deal}$ to $C_i$
6) Output $O_{deal}$

Get Protocol

Market
AddOrders
- INPUTS: list of orders $O^1...O^n$
- OUTPUTS: none
1) Gossip $O^1...O^n$ to the network MatchOrders
- INPUTS:
  - the current Retrieval Market OrderBook
  - query order to match $O^q$
- OUTPUTS: matching orders $O^1...O^n$
1) Match each $O^i$ in OrderBook such that:
   a) Check $O^i.piece$ is equal to $O^q.piece$
   b) If $O^q$ is an ask order:
      i) Check if $O^i$ is bid order
      ii) Check $O^i.price \geq O^q.price$
   c) If $O^q$ is a bid order:
      i) Check if $O^i$ is ask order
      ii) Check $O^i.price \leq O^q.price$
2) Output matched orders $O^1...O^n$ Exchange
SendPiece
- INPUTS:
  - an ask order $O_{ask}$
  - a bid order $O_{bid}$
  - a piece $p$
- OUTPUTS: a deal order $O_{deal}$ signed by $C_i$
1) Create $O_{deal}$:
   a) Set $O_{deal}.ask = O_{ask}$
   b) Set $O_{deal}.bid = O_{bid}$
2) Get identity of $C_i$ from $O_{bid}$ signature
3) Setup a micropayment channel with $C_i$
4) For each block of data $p_j$ of $p$:
   a) Set $\pi_j$ to be a merkle path from $H(p)$ to $p_j$
   b) Send $(O_{deal}, p_j, \pi_j)$ to $C_i$
   c) Receive $(O_{deal}, j)c_j$
5) Output $O_{deal}$ ReceivePiece
- INPUTS:
  - a client's key $C_j$
  - an ask order $O_{ask}$
  - a bid order $O_{bid}$
  - merkle tree hash of $p$ in the orders $h_p$
- OUTPUTS: a piece $p$
1) Create $O_{deal}$:
   a) Set $O_{deal}.ask = O_{ask}$
   b) Set $O_{deal}.bid = O_{bid}$
2) Get identity of $M_j$ from $O_{ask}$ signature
3) Set up a micropayment channel with $M_j$ (or re-using an existing one)
4) When receiving $(O_{deal}, p_j, \pi_j)$ from $M_j$:
   a) Check if $O_{deal}$ is valid and matches $O_{ask}$ and $O_{bid}$
   b) Check if $\pi_j$ is a valid merklepath with root hash $h_p$
   c) Send $(O_{deal}, j)c_j$
5) Output $p$

FIG. 7

```
Manage Protocol
Network                                          Miner
AssignOrders                                     PledgeSector
 • INPUTS:                                        • INPUTS:
    – deal orders O^1_deal..O^n_deal                 – current allocation table allocTable
    – allocation table allocTable                    – pledge request pledge
 • OUTPUTS: updated allocation table allocTable'  • OUTPUTS: allocTable'
 1) Copy allocTable in allocTable'                1) Copy allocTable to allocTable'
 2) For each order O^i_deal:                      2) Set tx_pledge := (pledge)
    a) Check if O^i_deal is valid according to    3) Submit tx_pledge to L
       Definition                                 4) Wait for tx_pledge to be included in L
    b) Get M_j from O^i_deal signature            5) Add new sector of size pledge.size in allocTable'
    c) Add details from O^i_deal to allocTable'   6) Output allocTable'
 3) Output allocTable'

RepairOrders                                     SealSector
 • INPUTS:                                        • INPUTS:
    – current time t                                 – miner public/private key pair M
    – current ledger L                               – sector index j
    – table of storage allocations allocTable        – allocation table allocTable
 • OUTPUTS: orders to repair O^1_deal..O^n_deal,  • OUTPUTS: a proof π_SEAL, a root hash rt
   updated allocation table allocTable            1) Find all the pieces p_1..p_n in sector S_j in the allocTable
 1) For each allocEntry in allocTable:            2) Set D := p_1|p_2|..|p_n
    a) If t < allocEntry.last + Δ_proof: skip     3) Compute (R, rt, π_SEAL) := PoSt.Setup(M, pk_SEAL, D)
    b) Update allocEntry.last := t                4) Output π_SEAL, rt
    c) Check if π is in L_{t-Δ_proof:t} and PoSt.Verify(π)
    d) On success: update allocEntry.missing := 0 ProveSector
    e) On failure:                                 • INPUTS:
       i) update allocEntry.missing += 1             – miner public/private key pair M
       ii) penalize collateral from M_j's pledge    – sector index j
    f) If allocEntry.missing > Δ_fault then set     – challenge c
       all the orders from the current sector     • OUTPUTS: a proof π_POS
       as failed orders                           1) Find R for sector j
 2) Output failed orders O^1_deal..O^n_deal and   2) Compute π_POST := PoSt.Prove(pk_POST, R, c, Δ_proof)
    allocTable'                                   3) Output π_POST
```

FIG. 8

Verifiable Market Protocol

Order matching:

1. Participants add *buy* orders and *sell* orders to the orderbook.
2. When two orders match, involved parties jointly create a *deal* order that commits the two parties to the exchange, and propagate it to the network by adding it to the orderbook.

Settlement:

3. The network ensures that the transfer of goods or services has been executed correctly, by requiring sellers to generate cryptographic proofs for their exchange/service.
4. On success, the network processes the payments and clears the orders from the orderbook.

FIG. 9

Storage Market Orders

*bid* order $O_{bid} = $ (size, funds[, price, time, coll, coding])$_C$

- size, the size of the piece to be stored
- funds, the total amount that client $C_i$ is depositing
- time, the maximum epoch time for which the file should be stored
- price, the spacetime price in Filecoin
- coll, the collateral specific to this piece that the miner is required to deposit
- coding, the erasure coding scheme for this piece

*ask* order $O_{ask}:$ ( space, price )$_{M_i}$

- space, amount of space Storage Miner $M_j$ is providing in the order
- price, the spacetime price in Filecoin

*deal* order $O_{deal}:$ ( ask, bid, ts, hash )$_{C_i, M_j}$

- ask, a cryptographic reference to $O_{ask}$ from $C_i$
- order, a cryptographic reference to $O_{bid}$ from $M_j$
- ts, timestamp epoch in which the order has been signed by $M_j$
- hash cryptographic hash of the piece that $M_j$ will store ---
<sup>a</sup>If not specified, the piece will be stored until expiration of funds.
<sup>b</sup>If not specified, when a Storage Miner is faulty, the network can re-introduce the order at the current best price.

Retrieval Market Orders

*bid* order $O_{bid}:$ ( piece, price )$_{C_i}$

- piece, the index of the piece requested
- price, the price at which $C_i$ is paying for one retrieval

*ask* order $O_{ask}:$ ( piece, price )$_{M_i}$

- piece, the index of the piece requested
- price, the price at which $M_j$ is serving the piece for

*deal* order $O_{deal}:$ ( ask, order )$_{C_i, M_j}$

- ask, a cryptographic reference to $O_{ask}$ from $C_i$
- order, a cryptographic reference to $O_{ask}$ from $C_i$ ---
<sup>a</sup>Only pieces stored in Filecoin can be requested

FIG. 10

Storage Market Protocol

Order Matching

1. Storage Miner $M_i$ and Client $C_j$ add orders to the OrderBook:
   (a) $M_i$ creates $O_{ask}^1, O_{ask}^2, \ldots$ and $C_j$ creates $O_{bid}^1, O_{bid}^2, \ldots$
   (b) Orders are submitted to the blockchain via Put.addOrders($O^1, O^2, \ldots$)
   (c) On success, the orders are added to the OrderBook, the funds from $C_j$ are deposited and the space from $M_i$ is reserved.

2. When orders match, involved parties jointly create $O_{deal}$ and add it to the OrderBook:
   (a) $M_i$ and $C_j$ independently query the OrderBook via Put.matchOrders($O$).
   (b) If $M_i$ and $C_j$ have matching orders :
      • $C_j$ sends the piece $p$ to $M_i$ via Put.SendPiece($O_{bid}, O_{ask}, p$)
      • $M_i$ receives the piece $p$ from $C_j$ via Put.ReceivePiece($O_{bid}, O_{ask}, p$).
      • $M_i$ signs $O_{deal}$ and sends it to $C_j$
   (c) $C_j$ signs $O_{deal}$ and adds it to the OrderBook via Put.addOrders($O_{deal}$)

Settlement

3. The Network checks if the Storage Miners are correctly storing the pieces:
   (a) When a Storage Miner fills a sector, they *seal* it (they create a unique replica) via Manage.SealSector and submit the proof $\pi_{SEAL}$ and rt to the blockchain.
   (b) Storage Miners generate new proofs at every epoch and add them to the Filecoin blockchain every $\Delta_{proof}$ epochs via Manage.ProveSectors.
   (c) The Network runs Manage.RepairOrders at every epoch. If proofs are missing or invalid, the network tries to repair in the following ways:
      • if any proofs are missing or invalid, it penalizes the Storage Miners by taking part of their collateral.
      • if a large amount of proofs are missing or invalid for more than $\Delta_{fault}$ epochs, it considers the Storage Miner *faulty*, settles the order as failed and reintroduces a new order for the same piece into the the market.
      • if every Storage Miner storing this piece is faulty, then the piece is lost and the client gets refunded.

4. When the time of the order is expired or funds run out, if the service was correctly provided, the Network processes the payments, and removes the orders.

FIG. 11

Retrieval Market Protocol

Order Matching:

1. Retrieval Miners and Clients add orders to the Get.OrderBook:
   (a) Retrieval Miners $M_i$ creates *ask* orders ($O_{ask}^1, O_{ask}^2, ...$) and Client $C_j$ creates *bid* orders ($O_{bid}^1, O_{bid}^2, ...$).
   (b) Both $M_i$ and $C_j$ gossip their orders in the Filecoin network via Get.addOrders
   (c) Since there is no *commonly shared* orderbook, when users receive orders, they add them to their own orderbook's view. Differently from the Storage Market, these orders are not binding and no resource is committed (e.g. clients don't do any deposit).

2. When orders match, involved parties jointly create $O_{deal}$ and add it to the Get.OrderBook:
   (a) Retrieval Miner $M_i$ and Client $C_j$ independently run Get.matchOrders that queries their own current Get.OrderBook view.
   (b) Both $M_i$ and $C_j$ sign $O_{deal}$ and add it to their Get.OrderBook via Get.addOrders (as described before)
   (c) $C_j$ and $M_i$ setup a micropayment channel for $O_{deal}$ Settlement:

3. Both parties check whether the piece has been delivered:
   (a) $M_i$ sends the piece $p$ in parts via Get.SendPiece
   (b) $C_j$ receives the $p$ in parts and for each part, $C_j$ acknowledges delivery by sending a micropayment via Get.ReceivePiece 4. When the $p$ has been received by $C_j$, $M_j$ can present the micropayments to the network and retrieve the payment, both parties remove their orders from the orderbooks.

FIG. 12

EC Election

| Storage Miner at epoch $t$ | Network node on receiving a block at epoch $t$ |
|---|---|
| ProveElect$(r, t, M_i) \to \{\bot, \pi_t^i\}$ | VerifyElect$(\pi_t^i, t, M_i) \to \{\bot, \top\}$ |
| 1. Compute $\mathcal{H}((t\|r)_i)/2^L \leq \frac{p_t^i}{\sum_j p_t^j}$ | 1. Check if $\pi_t^i$ is a valid signature from user $M_i$ on $t$ and $r$ |
| • on success, output $\pi_t^i = \langle t, r \rangle_i$ | 2. Check if $p_t^i$ is the power from $M_i$ at time $t$ |
| • otherwise output $\bot$ | 3. Test if $M_i$ is elected leader $\mathcal{H}(\pi_t^i)/2^L < \frac{p_t^i}{\sum_j p_t^j}$ |
| | • on success, output $\top$ |
| | • otherwise output $\bot$ |

CONSENSUS PROTOCOLS IN DISTRIBUTED COMPUTING SYSTEMS

RELATED APPLICATION

This application claims priority under 35 U.S.C. § 119(e) to provisional U.S. Patent Application 62/697,123, filed on Jul. 12, 2018, 62/697,091, filed on Jul. 12, 2018 and 62/697,097, filed on Jul. 12, 2018, the entire contents of which are hereby incorporated by reference.

BACKGROUND

Technical Field

This specification relates to distributed computing systems.

BACKGROUND

A distributed computing system can serve as a decentralized data storage system with data replicated and synced across multiple computing nodes. A blockchain is a continuously growing list of data records linked and secured using cryptographic technology. A blockchain can be managed by a distributed computing system, i.e., a blockchain network, with each computing node in the distributed computing system adhering to a consensus protocol for inter-node communication and new block validation.

SUMMARY

This specification describes technologies for proving in a distributed computing system that one computing node has stored specified data for a specified time period and selecting a leader based at least in part on the amount of data stored by candidate leaders. These technologies generally involve a task-performing computing node generating a proof and the distributed computing system verifying the proof and awarding the task-performing computing node. As one example, Filecoin is a protocol token whose blockchain runs on a proof, called Proof-of-Spacetime, where blocks are created by miners that are storing data. Filecoin protocol provides a data storage and retrieval service via a network of independent storage providers that does not rely on a single coordinator, where: (1) clients pay to store and retrieve data, (2) storage miners earn tokens by offering storage and (3) retrieval miners earn tokens by serving data. Storage miners can earn mining reward for participating in a consensus process, e.g., in a consensus process based on storage provided by miners.

In general, one innovative aspect of the subject matter described in this specification can be embodied in methods that include the actions of: (a) forwarding an input challenge to a prover at a start time, the input challenge having a time-stamp indicating the start time; (b) receiving a proof responsive to the input challenge from the prover, wherein the proof is based at least in part on a proof of storage; (c) generating a new input challenge based at least in part on the proof and forwarding the new input challenge to the prover; (d) repeating steps (b) and (c) a number of times resulting in a final proof; (e) receiving a proof result based at least in part on the final proof from the prover, the proof result having a time-stamp indicating the time the proof result is received; (f) determining that the time between the start time time-stamp and the proof result time-stamp is less than a specified period of time; (g) determining a winning prover from a plurality of candidate provers where a probability of a candidate prover being a winning prover is proportional to the candidate prover's assigned storage which is indicated at least in part by the candidate miner's proof result; (h) receiving a new block from the winning prover; and (i) adding the new block to a blockchain-based file storage system.

Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In particular, one embodiment includes all the following features in combination. The proof result can be based at least in part on a most-recent in time verification of an amount of data a candidate miner has been storing. The proof result can be based at least in part a set of proofs of storage. The proof result can be based on useful work. The useful work can be storage of data. The method can further include: (a) receiving at a prover original data from a client for storage by a prover; (b) receiving at the prover a challenge from a verifier; and (c) receiving a proof result from the prover indicating that the original data has been stored by the prover at least through a specified period of time. The verifier can be the client.

In general, another innovative aspect of the subject matter described in this specification can be embodied in methods that include the actions of: (a) maintaining, by a network of a plurality of computing devices, a blockchain file storage system, wherein each block of the blockchain file storage system comprises offered storage space, requested storage space, and assigned storage space of each of the plurality of computing devices at a specified past time; (b) generating a new block recording the offered storage space, requested storage space, and assigned storage space at the current time of each of the plurality of computing devices; (c) electing a computing device in the network wherein the probability of winning the election is proportional to each computing device's assigned storage as reflected in the last block; and (d) adding, by the elected computing device, the new block to the blockchain file storage system. The assigned storage space can be verified by the network.

In general, yet another innovative aspect of the subject matter described in this specification can be embodied in methods that include the actions of: (a) forwarding an input challenge to a miner at a start time, the input challenge having a time-stamp indicating the start time; (b) receiving a proof responsive to the input challenge from the miner, wherein the proof is based at least in part on a proof of storage; (c) generating a new input challenge based at least in part on the proof and forwarding the new input challenge to the miner; (d) repeating steps (b) and (c) a specified number of times resulting in a final proof; (e) receiving a proof result based at least in part on the final proof from the miner, the proof result having a time-stamp indicating the time the proof result is received; (f) determining that the time between the start time time-stamp and the proof result time-stamp being less than a specified period of time; (g) electing a miner from the plurality of candidate miners at a specified point in time where the probability of winning the election by a candidate miner is proportional to the candidate miner's assigned storage which can is indicated at least in part by the candidate miner's proof result; (h) receiving a new block from the elected miner; and (i) adding the new block to a blockchain-based file storage system.

In general, another innovative aspect of the subject matter described in this specification can be embodied in methods that include the actions of: (a) forwarding, to a prover, an input challenge at a start time, the input challenge having a time-stamp indicating the start time; (b) receiving a proof responsive to the input challenge from a prover, wherein the proof is based at least in part on a proof of storage; (c) generating a new input challenge based at least in part on the proof and forwarding the new input challenge to a prover; (d) repeating steps (b) and (c) a specified number of times resulting in a final proof; (e) receiving a proof result based at least in part on the final proof from the prover, the proof result having a time-stamp indicating the time the proof result is received; (f) determining that the time between the start time time-stamp and the proof result time-stamp being less than a specified period of time; (g) forwarding, to the verifier, the proof result; and (h) acting in response to receipt of the proof result.

A third-party service can provide the time-stamp for the start time and for the proof result. The time stamp for the input challenge can be based on the time the third party service receives the input challenge and the time stamp for the proof result can be based on the time the third party service receives the proof result.

The subject matter described in this specification can be implemented in particular embodiments so as to realize one or more of the following advantages. The distributed computing network can reliably and quickly verify that a task-performing computer node has stored requested data for a specified time period and it can do so without the intervention of a third-party verifier. Such a so-called proof-of-spacetime facilitates the operation of a decentralized storage network which can utilize vast otherwise unused resources, e.g., storage resources. Proof-of-spacetime also facilitates useful work proofs in a blockchain context increasing the usefulness of blockchain technology. Proof-of-spacetime can be used to facilitate establishing consensus in a blockchain context. Proof of spacetime in the cloud setting can provide storage guarantees to clients. Proof of spacetime can provide a proof of work (beyond blockchain) as an anti-spam technique (e.g. in order to send me an email, an entity needs to prove it had some specified data for some time).

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 1B is an example of a decentralized storage network protocol.

FIG. 4 illustrates examples of proof-of-replication and proof-of-spacetime protocols.

FIG. 5 illustrates an example of data structures in a decentralized storage network (DSN) scheme.

FIG. 6 illustrates an example execution of a Filecoin DSN, grouped by party and sorted chronologically by row.

FIG. 7 illustrates examples of the put and get protocols in a Filecoin DSN.

FIG. 8 illustrates example of the manage protocol in a Filecoin DSN.

FIG. 9 illustrates an example generic protocol for a verifiable market/exchange.

FIG. 10 illustrates an example of orders data structures for retrieval and storage markets/exchanges.

FIG. 11 illustrates an example of a detailed storage market/exchange protocol.

FIG. 12 illustrates an example of a detailed retrieval market/exchange protocol.

FIG. 13 illustrates an example of a leader election process via an expected consensus protocol.

Like reference numbers and designations in the various drawings indicate like elements.

DETAILED DESCRIPTION

Figure 1A:
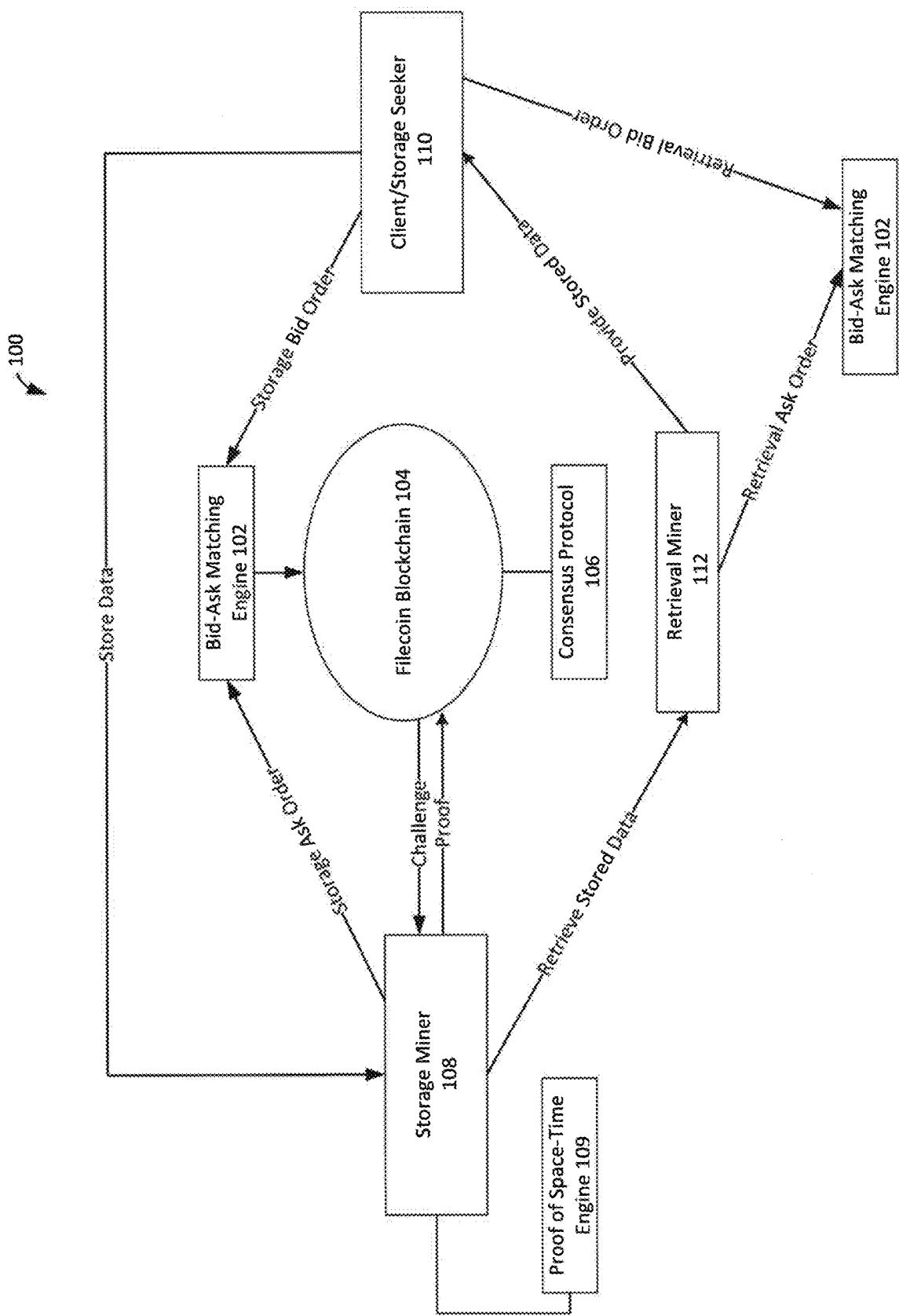
FIG. 1A is a schematic depiction of an example distributed computing system.

This specification relates to technologies for proving in a distributed computing system that one computing node has stored specified data for a specified time period. These technologies further relate to a task-performing computing node generating a proof of performance of the task, e.g., a proof of storage, and the distributed computing system verifying the proof and awarding the task-performing computing node. As one example, Filecoin is a protocol utilizing a blockchain that runs on a proof, called Proof-of-Spacetime, where blocks are created by miners that are storing data. The Filecoin protocol provides a data storage and retrieval service via a network of independent storage providers that does not rely on a single coordinator, where: (1) clients reward storage providers/storage miners and storage retrievers/retrieval miners for storing and retrieving data, (2) storage miners earn tokens by offering storage and (3) retrieval miners earn tokens by serving data. Storage miners can earn mining reward for participating in a consensus process, e.g., in a consensus process based on storage provided by miners.

The Filecoin protocol builds upon four components:

1. A Decentralized Storage Network (DSN) is a network of independent storage providers that offer storage and retrieval services. The Filecoin protocol is an incentivized, auditable and verifiable DSN construction. A decentralized network reduces or eliminates the networks reliance on a single coordinator (e.g., a single computing node) for at least a primary function of the network.

2. Proofs-of-Storage: The Filecoin protocol utilizes two Proofs-of-Storage: (1) Proof-of-Replication allows storage providers to prove that data has been replicated to its own uniquely dedicated physical storage. Enforcing unique physical copies enables a verifier to check that a prover is not deduplicating multiple copies of the data into the same storage space; (2) Proof-of-Spacetime allows storage providers to prove they have stored some data throughout a specified amount of time.

3. Verifiable Exchanges: The Filecoin protocol models storage requests and retrieval requests as orders in two decentralized verifiable exchanges operated by the Filecoin network. Verifiable exchanges ensure that rewards are distributed when a service has been correctly provided. The Storage Exchange and the Retrieval Exchange allow miners and clients to submit storage and retrieval orders, respectively.

4. Useful Proof-of-Work: This specification describes how to construct a useful Proof-of-Work based on Proof-of-Spacetime that can be used in consensus protocols. Miners do not need to spend wasteful computation to mine blocks, but instead store data in the network.

The Filecoin protocol is a DSN construction built on a blockchain and with a native token, i.e., the Filecoin token. Clients use tokens for storing and retrieving data and miners earn tokens by storing and serving data. The Filecoin DSN handles storage and retrieval requests respectively via two verifiable exchanges: the Storage Exchange and the Retrieval Exchange. Clients and miners set the values for the services requested and offered and submit their orders to the exchanges.

The Filecoin network operates the exchanges which employ Proof-of-Spacetime and Proof-of-Replication to guarantee that storage miners have correctly stored the data they committed to store. Finally, miners can participate in the creations of new blocks for the underlining blockchain. In one embodiment, the probability of a candidate miner being a miner that can create a new block is proportional to the candidate miner's assigned storage which is indicated at least in part by the candidate miner's proof of work, e.g., the candidate miner's proof of the amount of its storage currently in use in the network.

FIG. 1A is a schematic depiction of one example of a Filecoin DSN 100. The illustrated Filecoin DSN 100 includes a bid-ask matching engine 102, a Filecoin blockchain 104, a consensus protocol 106 for maintaining the Filecoin blockchain 104, a plurality of computing nodes serving as a storage seeker/client 110, a storage provider/storage miner 108, and a storage retriever/retrieval miner 112. Each of the plurality of computing nodes in the Filecoin DSN 100 can take on one or more roles as the client 110, the storage miner 108, and/or the retrieval miner 112.

Each of the plurality of computing nodes, e.g., client 110, the storage miner 108, and/or the retrieval miner 112, is connected to every other computing node in the Filecoin DSN 100. For example, the client 110, the storage miner 108, and/or the retrieval miner 112 can be connected using wired or wireless connections such as Ethernet, WLAN, Bluetooth, WiFi, etc.

The client 110, the storage miner 108, and the retrieval miner 112 each includes one or more processors programmed to execute a set of commands according to a Filecoin protocol. The Filecoin protocol specifies actions each computing node is programmed to take such as submitting a storage request, submitting a storage offer, submitting a retrieval request, submitting a retrieval offer.

The storage miner 108 includes one or more memory devices that can store, replicate, and return data per requests from the client 110 or the retrieval miner 112. The memory devices are divided into sectors and each sector can be sealed when storing a piece of data. Sealing is described below.

The Filecoin DSN 100 includes a Filecoin blockchain 104. The Filecoin blockchain 104 can be an immutable, append-only linked list of blocks. Each block can record the distribution of Filecoin tokens, the proposed and completed transactions, currently open storage/retrieval orders, and proofs of completed orders submitted at a specific time. The Filecoin blockchain 104 is used to implement a ledger-based reward system, with the storage provider 108 rewarded for successfully storing data from the client 110. Each computing node in the Filecon DSN can keep a local copy of the Filecoin blockchain. In an alternative embodiment, each miner or full node keeps a local copy of the Filecoin blockchain.

In one embodiment, when a change is made to the Filecoin blockchain, e.g., a new completed transaction, the change is broadcast to the entire Filecoin DSN and each local copy of the Filecoin blockchain is updated to reflect the change. An alternative embodiment can propagate changes only to a subset of nodes, or post a proof of correct changes.

FIG. 1B is an example of a decentralized storage network protocol, e.g., the Filecoin protocol. The Filecoin protocol includes a set of instructions that cause the Filecoin DSN 100, the client(s) 110, the storage miner(s) 108, and the retrieval miner(s) 112 to perform operations facilitating the storage/retrieval of data and the settlement of transactions in Filecoin tokens.

Network

The Filecoin DSN 100 comprises a plurality of computing nodes. In one embodiment, for each new block added to the Filecoin blockchain 104, the Filecoin DSN 100 is configured to check:

(a) if the block is in the valid format
(b) if all transactions contained in the block are valid
(c) if all orders contained in the block are valid
(d) if all proofs contained in the block are valid
(e) if all pledges contained in the block are valid If any of the above conditions are not met, the block can be disregarded and not appended to the Filecoin blockchain 104.

In one embodiment, for each new order introduced to the Filecoin DSN 100, the Filecoin DSN 100 is configured to:

(a) add the order to the Filecoin blockchain's orderbook
(b) if the order is a storage bid order, lock the associated Filecoin tokens from the client 110
(c) if the order is a storage ask order, lock the associated memory space from the storage miner
(d) if the order is a deal order, assign the data from the client 110 to the storage miner 108.

In one embodiment, for each order that has already been recorded in the Filecoin blockchain 104, the Filecoin DSN is configured to:

(a) check if the order has expired or been canceled. For example, each order can have a time associated with the order. If the specified time runs out, the Filecoin DSN 100 can remove the order from the Filecoin blockchain 104, return unspent Filecoin tokens to the client, and free the space for the storage miner.
(b) If the order is a deal order, check if the expected proofs have been generated by the storage miner. If any of the proofs are missing, the Filecoin DSN penalizes the storage miner by taking part of its pledged collateral. if a large mount of proofs are missing, the Filecoin DSN can cancel the order and reintroduces the order to the market. In another example, if the data cannot be retrieved from the storage miner, the Filecoin DSN cancels the order and refunds the client.

Storage Miner

In one embodiment, at any time the storage miner 108 can execute the Filecoin protocol to perform the following example actions: (1) renew expired pledges by putting new collateral into the Filecoin blockchain, (2) pledge new storage, and (3) submit a new storage ask order to the Filecoin blockchain.

In one embodiment, for each storage ask order in the orderbook of the Filecoin blockchain 104, the storage miner 108 is configured to:
(a) find matched storaged bid orders from clients stored in the orderbook, and
(b) star a deal order by contacting the matching client 110.

In one embodiment, for each sector of storage space pledged to the Filecoin blockchain 104, the storage miner 108 is configured to:
(a) generate proofs of storage, and
(b) at the appropriate time, post the proofs to the Filecoin blockchain 104.

In one embodiment, after a storage ask order is matched, the storage miner 108 receives data from the client 110. The storage miner 108 can then be configured to, as specified by the Filecoin protocol:
(a) check if the piece of data is of the right size as specified in the storage bid order
(b) create a deal order and sign the deal order, for example, by signing the order with a public key associated with the storage miner in the Filecoin DSN
(c) store the data in a sector of its storage space, and
(d) seal a sector if the sector is full.

Client

In one embodiment, at any time the client 110 can submit new storage bid orders to the Filecoin blockchain 104. The client 110 can further find matching storage ask orders and send data to the matched storage miner 108.

In one embodiment, at any time the client 110 can submit new storage retrieval orders to the Filecoin blockchain 104. The client 110 can find matching orders and create a Filecoin token payment channel with the retrieval miner 112.

After receiving a signed deal order from the storage miner 108, the client 110 can sign the deal order, e.g., using its own public key in the Filecoin DSN 100, and submit the signed deal order to the Filecoin blockchain 104.

After receiving data from the retrieval miner 112, the client 110 can verify the data and send Filecoin tokens as a reward to the retrieval miner 112.

Retrieval Miner

In one embodiment, at any time the retrieval miner 112 can submit a retrieval ask order to the Filecoin blockchain 104 and listen to a retrieval bid order from the Filecoin blockchain 104.

In one embodiment, after matching a retrieval request from the client 110, the retrieval miner 112 is configured to:
(a) initiate a payment/reward channel with the client 110
(b) retrieve the data in multiple parts from the storage miner, and
(c) send the data in parts to the client after receiving payment/reward for the respective part.

Storage Exchange and Storage Requests

In one embodiment, the client 110 can store data using the Filecoin DSN 100 by rewarding the storage miner 108 in Filecoin tokens. For example, the client 110 can submit a bid order according to the Filecoin protocol to a storage exchange orderbook. The storage exchange orderbook is part of the Filecoin blockchain and records the requests from all clients in the Filecoin DSN 100. For example, the bid order can include information such as the identity of the client 110 in the Filecoin DSN 100, the amount of data to be stored, the number of copies to be stored, the length of storage time, the maximum amount of Filecoin tokens to be awarded. The updated storage exchange orderbook will be broadcast to the Filecion DSN 100 to be visible to participating computing nodes.

The storage miner 108 can earn Filecoin tokens specified in the bid order by fulfilling the bid order. To fulfill a bid order, the storage miner 108 first pledges to provide storage to the Filecoin DSN 100 according to the Filecoin protocol. For example, a pledge can include collateral in the form of Filecoin tokens. The collateral is deposited for the time intended to provide the service, and is returned to the storage miner 108 if the storage miner successfully fulfills the bid order, e.g., generating proofs of storage for the data it commits to store. If some proofs of storage fail, a proportional amount of the collateral will be lost. Generating proofs is explained below, e.g., with reference to FIG. 3. The pledges are recorded in the Filecoin blockchain 104 to be visible to computing nodes in the Filecoin DSN 100.

In one embodiment, once the pledge appears in the Filecoin blockchain 104, the storage miner 108 can submit an ask order to the DSN orderbook. In one embodiment order matching, pledges, proofs posting are added on chain. However parts of this protocol can be run off-chain using state channels and different trust assumptions (e.g. one embodiment of the protocol can elect a set of nodes to perform the verification tasks that blockchain nodes would have to do otherwise). There are at least two things that can be done off-chain: propagation of proofs/orders (one can propagate proofs/orders with traditional gossiping) and verification of correctness (as described above).

Similar to the bid order, the ask order can include the identity of the storage miner 108, the amount of storage the storage miner 108 offers, the length of the storage, and the asking award in Filecoin tokens. The bid-ask matching engine 102 periodically checks the current state of the ask orders from the client 110 and bid orders from the storage miner 108, and matches ask orders to bid orders where the ask order substantially satisfies the bid order.

Once the bid-ask matching engine matches an ask order and a bid order matches, a piece of data is sent from the client 110 to the storage miner 108 for the storage miner to store. Upon receiving the data, the storage miner performs a sealing operation to transform the received data into a replica, e.g., a unique physical copy of the data that is associated with an identity of the storage miner.

The sealing operation is a slow, sequential operation that is several order of magnitude slower to perform compared to the proof generation operation. As a result, the storage miner 108, when requested to provide a proof of the storage, cannot generate a new replica on the fly since the expected time for a proof is much shorter than that the time to perform a sealing operation. For example, sealing can be realized using pre-existing techniques such as layering iterations of AES-256, Depth Robust Graphs, Slow Hash-functions (e.g. Sloth) to transform the received data into an encoded replica.

The deal order is submitted to the orderbook after the match. A network entity, e.g., the client/storage requester or the storage provider, can submit the order to the orderbook.

When the storage miner 108 is assigned the data, it can generate one or more proofs of replication (described further below) to indicate that the data is indeed being stored. The storage miner 108 posts a proof of storage on the Filecoin blockchain and other computing nodes in the Filecoin DSN 100 can verify the proofs. If a storage miner fails to generate a proof, or if a storage miner's proof is invalid, the storage miner 108 can be penalized (loss of tokens) and/or not rewarded. For example, in some embodiments, the storage miner 108 can lose all or part of its collateral.

Retrieval Exchange/Market and Retrieval Requests

In one embodiment, upon a request from the client 110, the retrieval miner 112 retrieves stored data from the storage miner 108 for the client 110 and is awarded Filecoin tokens.

The client 110 can submit a bid order to the retrieval market orderbook by broadcasting a request to the Filecoin DSN 100. The orderbook can be run off-chain by having nodes broadcasting their orders.

The retrieval miner 112 submits an ask order to the same retrieval market orderbook by asking for a specified award in Filecoin tokens. When a matching bid-ask order is found, the client 110 receives the data from the retrieval miner 112. When the data is received, the client and the retrieval miner 112 sign a deal order and submit it to the Filecoin blockchain 104 to confirm that the exchange succeeded.

The bid-ask engine again monitors the orderbook and matches asks and bids for the retrieval exchange. micro-awards are made once the bid-ask engine makes a match and the deal is completed.

Figure 2:
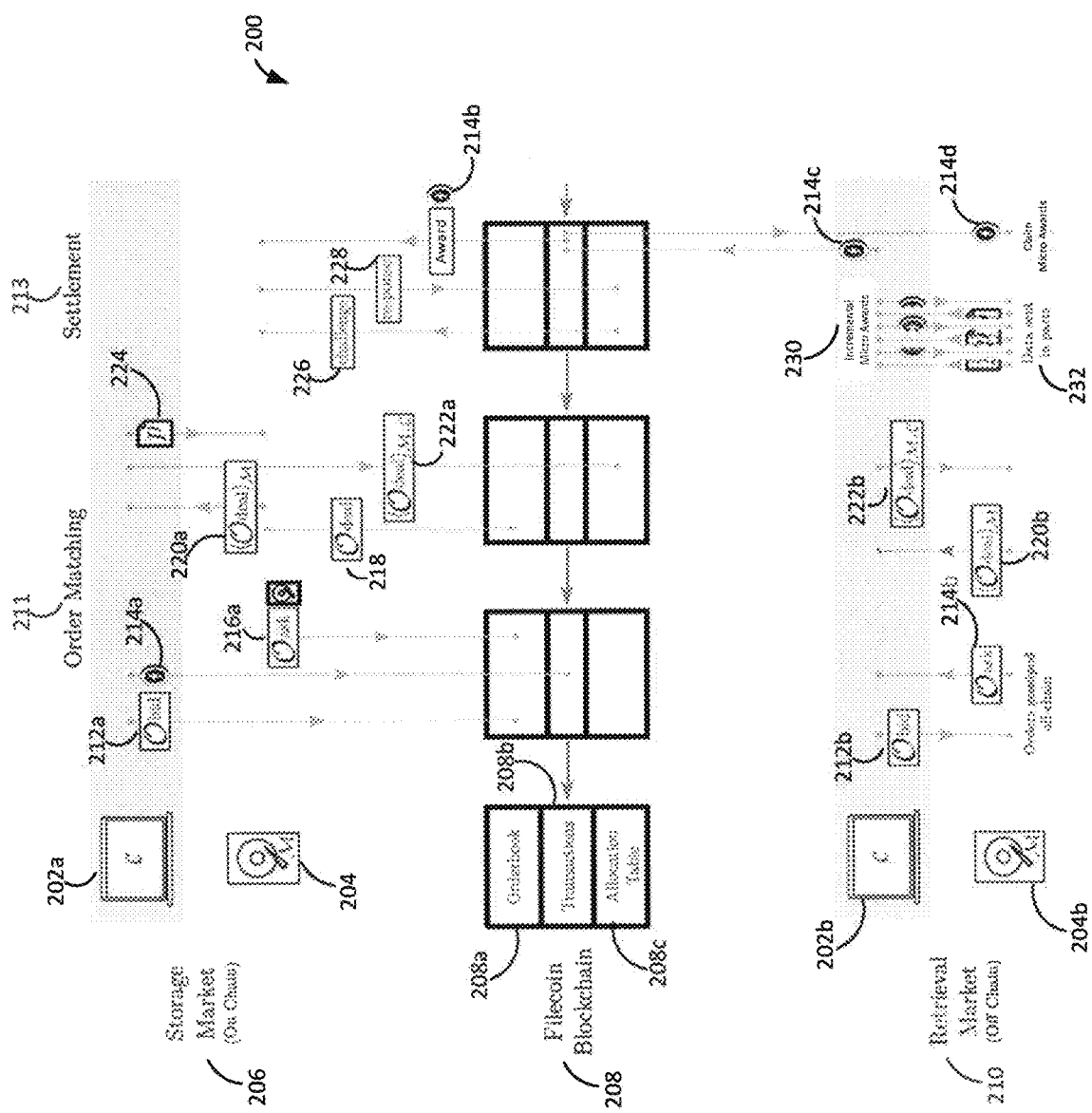
FIG. 2 is a schematic depiction of an example workflow for fulfilling a storage request in the distributed computing system.

FIG. 2 is a schematic depiction of an example workflow for fulfilling a storage request in a distributed computing system. For convenience, the process 200 will be described as being performed by a system of one or more computers, located in one or more locations, and programmed appropriately in accordance with this specification. For example, a distributed computing system, e.g., the Filecoin DSN system 100 of FIG. 1, appropriately programmed, can perform the process 200.

Stated differently, FIG. 2 is an illustration of the Filecoin protocol, showing an overview of client (202a, 202b)-miner (204a, 204b) interactions. The storage market 206 and retrieval market 210 are shown above and below the blockchain 208, respectively, with time advancing from the order matching phase 211 on the left to the Settlement 213 phase on the right. The blockchain includes an orderbook 208a section, a transactions 208b section and an allocation table 208c section.

Turning first to order matching 211 for the storage market 206, a client 202a makes a storage bid order 212a that is recorded in the orderbook 208a. The client 202a also records filecoin from the client pursuant to the storage bid in the transactions section 208b of the blockchain 208. One or more storage miners 204a can also submit a storage ask order 216a to the orderbook 208a of the blockchain 208. For example, the storage miner 204a can first pledge its storage to the Filecoin DSN 100 (FIG. 1) by depositing collateral in Filecoin tokens according to a command specified in the Filecoin protocol. The pledge transaction is recorded on the Filecoin blockchain 208 and is visible to computing nodes in the Filecoin DSN 100 (FIG. 1). The collateral is deposited for the time intended to provide the storage service, and is provided to the storage miner 204a if the storage miner 204a generates valid proofs of storage for the data it committed to store. If some proofs of storage fail, a proportional amount of the collateral is lost or given to the client 202a.

After the storage miner 204a completes the pledge transaction, the storage miner 204a can offer its storage to the client 202a by submitting a storage ask order 216a to the Filecoin blockchain 208 according to a command specified in the Filecoin protocol. The storage ask order 216a is recorded in the orderbook 208a of the Filecoin blockchain 208 and is visible to computing nodes in the Filecoin DSN 100 (FIG. 1). The storage ask order 216a includes information such as the network identity of the storage miner 204, the amount of collateral, the storage space and length of time, the asking price in Filecoin tokens, etc.

With reference to FIG. 1, a bid-ask matching engine 102 can determine if there is an ask order from a storage miner that matches the client bid order, e.g., the engine 102 can determine if there is a storage miner that has submitted a qualifying ask order indicating the storage miner can store the data specified by the client under mutually agreeable terms. The matching can be performed by comparing one or more properties of the storage bid order 212a to one or more corresponding properties of the storage ask order 216a.

With reference again to FIG. 2, the matched bid-ask deal 218 is logged in the orderbook 208a of the blockchain 208 and forwarded to miner 204a for signing. The storage miner signed deal 220a is then forwarded to the client 202a for signing. The storage miner and client signed deal 220a is then logged in the allocation table 208c of the blockchain 208 and a piece of data in question is transferred from the client 202a to the storage miner 206.

Turning to settlement 213 for the storage phase 206, for the storage miner 204 to receive an award 214b in Filecoin tokens for storing the data 224, the storage miner 204 can prove to the Filecoin DSN that it is correctly storing the data 224. The storage miner 204 seals a sector of its storage device, thus creating a unique replica of the data 224. A challenge 226 may issue to the storage miner 204 regarding a piece of data. In response to the challenge 226, the storage miner 204 generates a proof 228 and submits the proof to the Filecoin blockchain. The proof is recorded in an allocation table 208c. For example, the storage miner 204 can generate new proofs at every epoch and add them to the Filecoin blockchain using a command in the Filecoin protocol. As a result (e.g., if the response is verified), the award in filecoin 214b can be transferred to the storage miner 204a.

In one embodiment, the proofs are visible to the Filecoin DSN and can be checked by other computing nodes. if proofs are missing or invalid, the Filecoin DSN penalizes the storage miner 204 by taking part of the collateral. if a specified amount of proofs are missing or invalid for more than a specified period of time, the Filecoin DSN considers the storage miner 204 to be faulty and settles the order as failed and reintroduces a new order for the same data into the Filecoin Blockchain 208.

In one embodiment, when the time of the order is expired or Filecoin tokens paid by the client 202a runs out, and the proof 228 is verified by the Filecoin DSN, the Filecion DSN transfers the agreed amount of Filecoin tokens 214b to the storage miner 204 and removes the order from the Filecoin blockchain 208.

With regard to order matching 211 for retrieval 210, The client 202b can post a retrieval bid order, e.g., the client's retrieval bid order can be gossiped to a retrieval miner 204b off chain. Similarly, a retrieval miner 204b can post an ask order to a client 202b, e.g., a retrieval miner's ask order can be gossiped to a client 202b off chain. If there is a match between the client's retrieval bid order and the retrieval miner's ask order, the retrieval miner 204b can sign the deal 220b and the client 202b can sign the deal 222b.

Turning to the settlement 213 for the retrieval phase 210, the retrieval miner 204b can send the retrieved data 232 to the client 202b in parts and after each part is sent the client 202b can commit to micro-awards 230 for the retrieval miner 204b. Note that in one embodiment before micro-awards can be made for retrieval, the client locks the tokens for the microtransaction, e.g., the client indicates that the tokens are locked for use as a micro-award for a specified deal. Once the client 202b has received the specified data, the client 202b can log a filecoin transfer 214c with the transactions section 208b of the blockchain 208. Finally, the retrieval miner 204b can claim its filecoin award 214d.

Definition of a Decentralized Storage Network

This specification introduces the notion of a Decentralized Storage Network (DSN) scheme. DSNs aggregate storage offered by multiple independent storage providers and self-coordinate to provide data storage and data retrieval to clients. Coordination is decentralized and does not require trusted parties: the secure operation of theses systems is achieved through protocols that coordinate and verify operations carried out by individual parties. DSNs can employ different strategies for coordination, including Byzantine Agreement, gossip protocols, or CRDTs, depending on the requirements of the system. Later, this specification provides a construction for a Filecoin DSN.

Definition

A DSN scheme is a tuple of protocols run by storage providers and clients:
(Put, Get, Manage)
Put(data)→key: Clients execute the Put protocol to store data under a unique identifier key.
Get(key)→data: Clients execute the Get protocol to retrieve data that is currently stored using key.
Manage( ): The network of participants coordinates via the Manage protocol to: control the available storage, audit the service offered by providers and repair possible faults. The Manage protocol is run by storage providers often in conjunction with clients or a network of auditors.

In one embodiment, a DSN scheme guarantees data integrity and retrievability as well as tolerates management and storage faults defined in the following sections.

Fault Tolerance

For example, management faults can be defined to be byzantine faults caused by participants in a Manage protocol. A DSN scheme relies on the fault tolerance of its underlying Manage protocol. Violations on the faults tolerance assumptions for management faults can compromise liveness and safety of the system. For example, consider a DSN scheme, where the Manage protocol requires Byzantine Agreement (BA) to audit storage providers. In such a protocol, the network receives proofs of storage from storage providers and runs BA to agree on the validity of these proofs. If the BA tolerates up to f faults out of n total nodes, then our DSN can tolerate f<n=2 faulty nodes. On violations of these assumptions, audits can be compromised.

Storage Faults

Storage faults can be defined to be byzantine faults that prevent clients from retrieving the data: i.e. Storage Miners lose their pieces and/or Retrieval Miners stop serving pieces. A successful Put execution is (f, m)-tolerant if it results in its input data being stored in m independent storage providers (out of n total) and it can tolerate up to f byzantine providers. The parameters f and m depend on protocol implementation; protocol designers can fix f and m or leave the choice to the user, extending Put(data) into Put(data, f, m). A Get execution on stored data is successful if there are fewer than f faulty storage providers.

For example, consider a simple scheme, where the Put protocol is designed such that each storage provider stores all of the data. In this scheme m=n and f=m−1. Note that f=m−1 is not always true. Some schemes can be designed using erasure coding, where each storage providers store a special portion of the data, such that x out of m storage providers are required to retrieve the data; in this case f=m−x.

Properties

In one embodiment, a DSN scheme can have two central properties, i.e., data integrity and retrievability, as well as additional properties.

The data integrity property states that no bounded adversary A can convince clients to accept altered or falsified data at the end of a Get execution.

The DSN scheme provides data integrity if: for any successful Put execution for some data d under key k, there is no computationally-bounded adversary A that can convince a client to accept d', for d' not equal to d at the end of a Get execution for identier k.

The retrievability property states that, given the fault-tolerance assumptions of the DSN scheme, if some data has been successfully stored in the DSN scheme and storage providers continue to follow the protocol, then clients can eventually retrieve the data.

The DSN scheme provides retrievability if: for any successful Put execution for data under key, there exists a successful Get execution for key for which a client retrieves data.

In one embodiment, DSN schemes can provide other properties specific to their application. Three example properties required by the Filecoin DSN include: public verifiability, auditability, and incentive-compatibility.

For example, a DSN scheme is publicly verifiable if for each successful Put, the network of storage providers can generate a proof that the data is currently being stored. The Proof-of-Storage convinces any efficient verifier, which only knows key and does not have access to data.

For example, a DSN scheme is auditable if it generates a verifiable trace of operation that can be checked in the future to confirm storage was indeed stored for the right duration of time.

For example, a DSN scheme is incentive-compatible if storage providers are rewarded for successfully offering storage and retrieval service, or penalized for misbehaving, such that the storage providers' dominant strategy is to store data.

Proof-of-Replication and Proof-of-Spacetime

In the Filecoin protocol, storage providers/miners convince their clients that they stored the data they were paid to store; in practice, storage providers generate Proofs-of-Storage (PoS) that the blockchain network (or the client itself) verifies.

This specification provides implementations for Proof-of-Replication (PoRep) and Proof-of-Spacetime (PoSt) schemes used in Filecoin.

Motivation

Proofs-of-Storage (PoS) schemes allow a user, e.g., the client, who outsources data to a server, e.g., the storage miner, to repeatedly check if the server is still storing the data. The user can verify the integrity of the data outsourced to a server in a more efficient way than downloading the data. The server generates probabilistic proofs of possession by sampling a random set of blocks and transmits a small amount of data in a challenge/response protocol with the user.

Provable data possession (PDP) and proof of retrievability (PoR) schemes only guarantee that a prover had possession of some data at the time of the challenge/response. In Filecoin, stronger proofs are useful to prevent three types of attacks that malicious miners might try to exploit in an effort to get rewarded for storage they are not providing: Sybil attacks, outsourcing attacks, generation attacks.

Sybil attacks: malicious miners could try to pretend to store (and get paid for) more copies than the ones physically stored by creating multiple sybil identities, but storing the data only once.

Outsourcing attacks: malicious miners could commit to store more data than the amount they can physically store, relying on quickly fetching data from other storage providers.

Generation attacks: malicious miners could claim to be storing a large amount of data which they are instead efficiently generating on-demand using a small program. If the program is smaller than the purportedly stored data, this inflates the malicious miner's likelihood of winning a block reward in Filecoin, which (as described further below) is proportional to the miner's storage currently in use.

Proof-of-Replication

Proof-of-Replication (PoRep) is a Proof-of-Storage which allows a server (i.e. the prover P) to convince a user (i.e. the verifier V) that some data D has been replicated to its own uniquely dedicated physical storage. The PoRep protocol is an interactive protocol, where the prover P: (a) commits to store n distinct replicas (physically independent copies) of some data D, and then (b) convinces the verifier V, that P is indeed storing each of the replicas via a challenge/response protocol. PoRep improves on PoR and PDP schemes, preventing Sybil Attacks, Outsourcing Attacks, and Generation Attacks.

Definition (Proof-of-Replication) A PoRep scheme enables an efficient prover P to convince a verifier V that P is storing a replica R, a physical independent copy of some data D, unique to P. A PoRep protocol is characterized by a tuple of polynomial-time algorithms:

(Setup, Prove, Verify)

PoRep:Setup($1^\lambda$, D)→R, $S_P$; $S_V$, where $S_P$ and $S_V$ are scheme-specific setup variables for P and V, and $\lambda$ is a security parameter. PoRep:Setup is used to generate a replica R, and give P and V the necessary information to run PoRep:Prove and PoRep:Verify. Some schemes may require the prover or interaction with a third party to compute PoRep:Setup.

PoRep:Prove($S_P$, R, C)→$|\lambda^c$, where c is a random challenge issued by a verifier V, and $\pi^c$ is a proof that a prover has access to R a specific replica of D. PoRep.Prove is run by P to produce a $\pi^c$ for V.

PoRep:Verify($S_V$, c, $\pi^c$)→{0, 1}, which checks whether a proof is correct. PoRep.Verify is run by V and convinces V whether P has been storing R.

Proof-of-Spacetime

Proof-of-Storage (PoS) schemes allow a user to check if a storage provider is storing the outsourced data at the time of the challenge. One can use PoS schemes to prove that some data was being stored throughout a period of time. The user can repeatedly (e.g. every minute) send challenges to the storage provider. However, the communication complexity required in each interaction can be a bottleneck in systems such as Filecoin, where storage providers submit their proofs to the blockchain network.

To address this issue, one can use Proof-of-Spacetime, where a verifier can check if a prover is storing its outsourced data for at least a minimum period of time. One intuition is to require the prover to (1) generate sequential Proofs-of-Storage (in one case Proof-of-Replication), as a way to determine time (2) recursively compose the executions to generate a short proof.

Definition (Proof-of-Spacetime): A PoSt scheme enables an efficient prover P to convince a verifier V that P is storing some data D for some time t. A PoSt is characterized by a tuple of polynomial-time algorithms:

(Setup, Prove, Verify)

PoSt:Setup($1^\lambda$, D)→$S_P$, $S_V$, where $S_P$ and $S_V$ are scheme-specific setup variables for P and V, is a security parameter. PoSt:Setup is used to give P and V the necessary information to run PoSt:Prove and PoSt:Verify. Some schemes may require the prover or interaction with a third party to compute PoSt:Setup.

PoSt:Prove($S_P$, D, c, t)→$\pi^c$, where c is a random challenge issued by a verifier V, and $\pi^c$ is a proof that a prover has access to D for some time t. PoSt:Prove is run by P to produce a $\pi^c$ for V.

PoSt:Verify($S_V$, c, t, $\pi^c$)—{0, 1}, which checks whether a proof is correct. PoSt:Verify is run by V and convinces V whether P has been storing D for some time t.

Practical PoRep and PoSt

This specification describes practical PoRep and PoSt constructions that can be deployed in existing systems and do not rely on trusted parties or hardware. One construction for PoRep requires a very slow sequential computation Seal to be performed during Setup to generate a replica. The protocol sketches for PoRep and PoSt are presented in FIG. 4 and the underlying mechanism of the proving step in PoSt is illustrated in FIG. 3.

Figure 3:
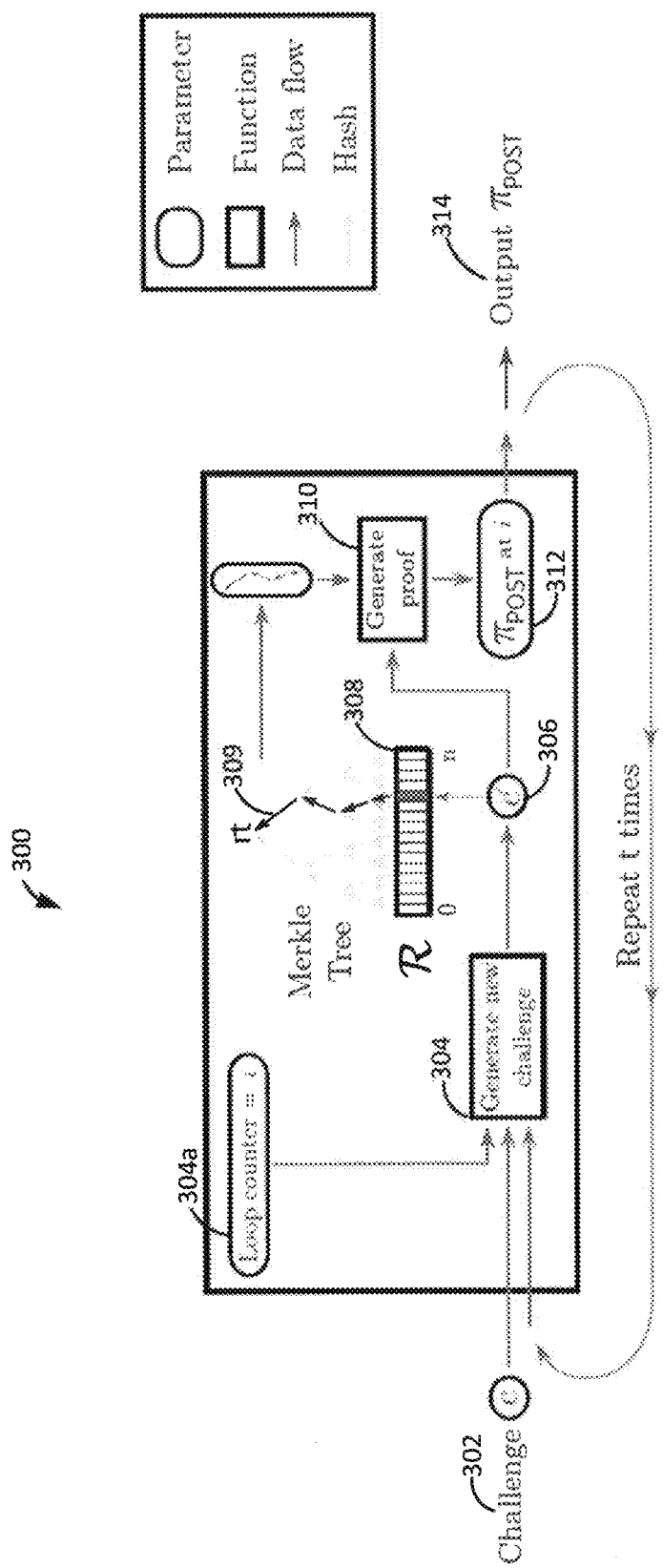
FIG. 3 is a schematic depiction of an example workflow for generating a space-time proof.
Figure 14:
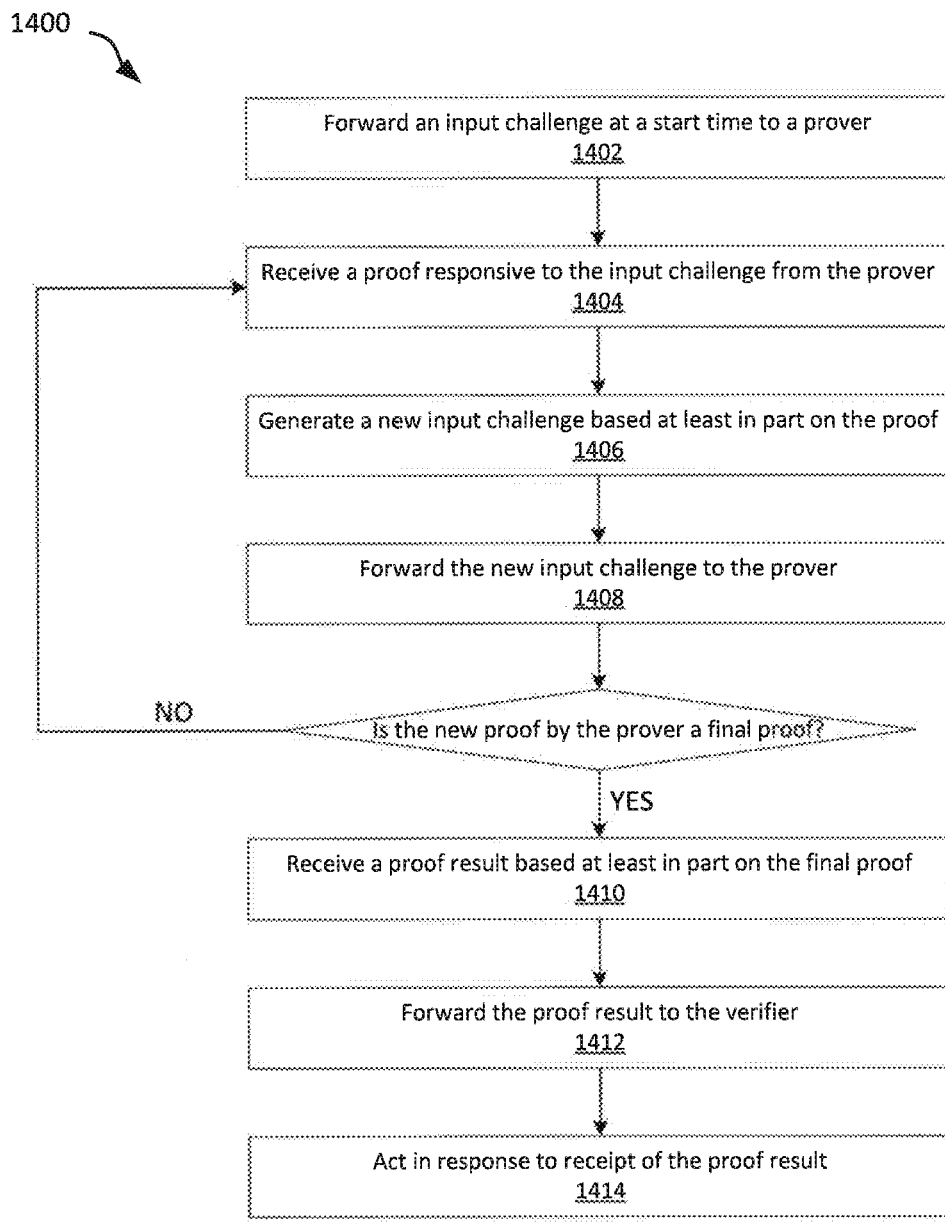
FIG. 14 is a flowchart of an example process for a space-time proof.
Figure 15:
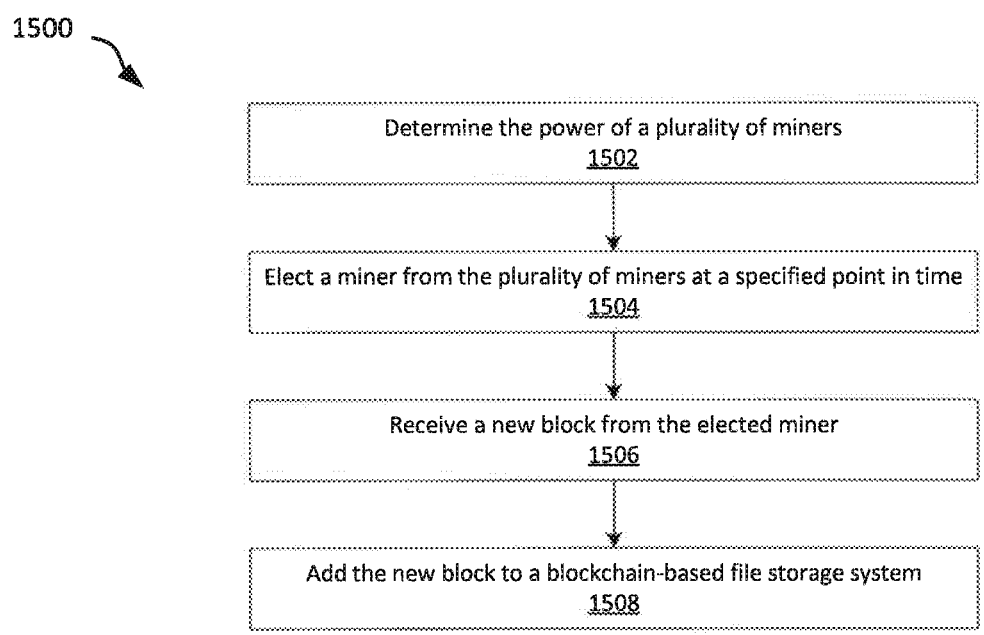
FIG. 15 is a flowchart of an example process for determining a winning prover from a plurality of candidate provers.
Figure 16:
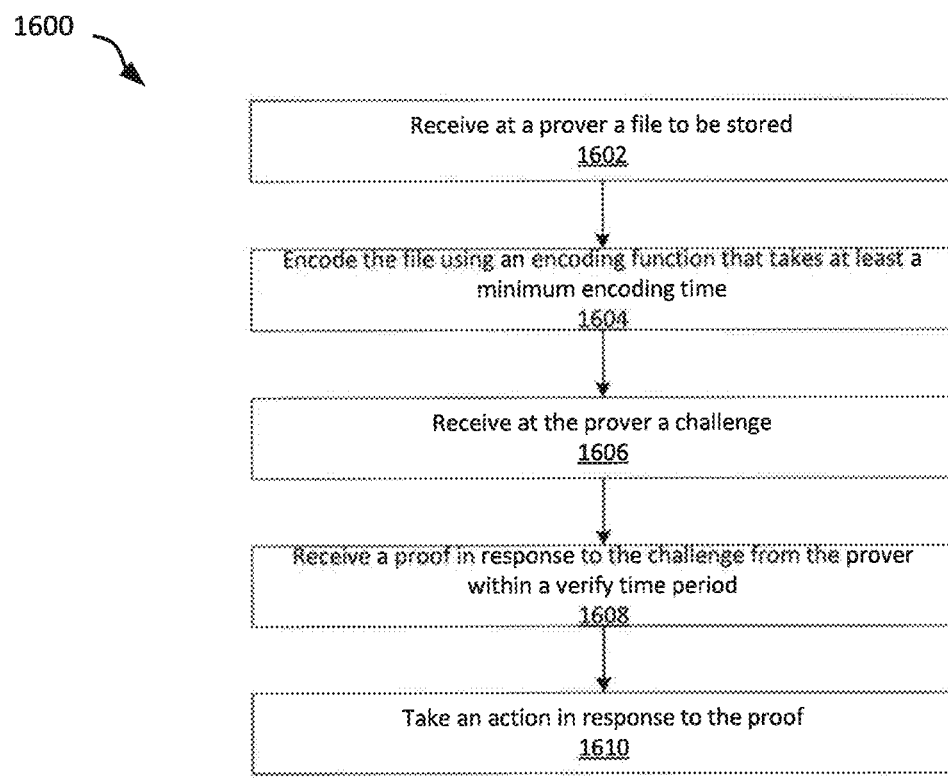
FIG. 16 is a flowchart of an example process for proof of replication.

More specifically, FIG. 3 is a schematic depiction of an example workflow for generating a space-time proof. FIG. 3 illustrates the underlying mechanism of PoSt.Prove showing an iterative proof to demonstrate storage over time. Initially, an input challenge 302 is forwarded to a prover. The proof of spacetime engine 300 at the prover receives an input challenge 302 at the new challenge generation engine 304. Given receipt of the input challenge, the new challenge generation engine 304 passes the challenge on to proof generation engine 310 which generates a proof 312, e.g., an initial proof labelled to indicate that it is responsive to the initial challenge 302.

In some embodiments, the prover does not need to receive a challenge for the very first proof. In other words, some proof of replication schemes might be non-interactive, and thus do not need a challenge (for example, using fiat-shamir heuristics). The proof described can be interactive or non-interactive proofs (where the challenge for the first proof is not needed).

The initial proof is then fed back into the new challenge generator 304 to generate a new challenge 306. The process of feeding a proof back into the new challenge generator completes a loop of the proof of spacetime engine 300 and increments a loop counter 304a that also feeds into the new challenge generator 304 allowing the new challenge generator to label the challenge 306 with a loop counter index which in turn allows the proof generator 310 to label each output proof 312 with a loop counter index.

How often a verifier requests a proof can be dictated by the time that it takes to run a sealing process (e.g., to run the setup for the proof of replication). However, in a general setting (no proof of replication), the closer the requests, the higher the guarantees of files being stored through time. If one wants a file to be available every hour, then one can have a challenge per hour, if one want a file to be more regularly available, one can have a challenge every minute.

Cryptographic Building Blocks

Collision-resistant hashing. With continuing reference to FIG. 3, the proof-of-spacetime engine 300 can use a collision resistant hash function CRH: $\{0; 1\}^* \rightarrow \{0, 1\}^{O(\lambda)}$. The protocol can use a collision resistant hash function Merkle-CRH 308, which divides a string in multiple parts, constructs a binary tree and recursively applies CRH and outputs the root. The root can then be an input into the proof generation engine 310.

zk-SNARKs. Implementations of PoRep and PoSt can rely on zero-knowledge Succinct Non-interactive ARguments of Knowledge (zk-SNARKs). Because zk-SNARKs are succinct, proofs are very short and easy to verify. More formally, let L be an NP language and C be a decision circuit for L. A trusted party conducts a one-time setup phase that results in two public keys: a proving key pk and a verification key vk. The proving key pk enables any (untrusted) prover to generate a proof attesting that x□L for an instance x of her choice. The non-interactive proof π is both zero-knowledge and proof-of-knowledge. A proof about some computation is zero knowledge if it doesn't leak any private input or intermediate steps. A malicious verifier can learn nothing beyond the output. A proof of knowledge is a proof where a prover can convince a verifier that they know of some witness. The prover needs to demonstrate that they have this knowledge. In a standard protocol, the prover can just send the witness to the verifier. In a zero-knowledge proof of knowledge, the prover proves that they have some knowledge without leaking what their knowledge is or any intermediate steps (in one case the knowledge is the file being stored). In certain implementations zero knowledge is not used. Anyone can use the verification key vk to verify the proof π; in particular zk-SNARK proofs are publicly verifiable: anyone can verify π, without interacting with the prover that generated π. The proof π has constant size and can be verified within a time period that is linear in |x|.

A zk-SNARK for circuit satisfiability is a triple of polynomial-time algorithms (KeyGen, Prove, Verify)

KeyGen($1^\lambda$, C)→(pk, vk). On input security parameter λ and a circuit C, KeyGen probabilistically samples pk and vk. Both keys are published as public parameters and can be used to prove/verify membership in $L_C$.

Prove(pk, x, w)→π. On input pk and input x and witness for the NP-statement w, the prover Prove outputs a non-interactive proof n for the statement $x \in L_C$.

Verify(vk, x, π)→{0, 1}. On input vk, an input x, and a proof π, the verifier Verify outputs 1 if $x \in L_C$.

Implementations of zk-SNARK systems are available. Generally these systems require the KeyGen operation to be run by a trusted party; work on Scalable Computational Integrity and Privacy (SCIP) systems can avoid this initial step.

Seal Operation

The role of the Seal operation is to (1) have replicas be physically independent copies by having provers store a pseudo-random permutation of D unique to their public key, such that committing to store n replicas results in dedicating disk space for n independent replicas (hence n times the storage size of a replica) and (2) to have the generation of the replica during PoRep:Setup take substantially longer than the time expected for responding to a challenge.

The above operation can be realized with an appropriate seal technique such as $Seal^T_{AES-256}$. $Seal^T_{AES-256}$ takes 10-100× longer than the honest challenge-prove-verify sequence. Note one can choose T such that running $Seal^T_{BC}$ is distinguishably more expensive than running Prove with random access to R.

Practical PoRep Construction

This section describes the construction of the PoRep protocol and includes a simplified protocol sketch in FIG. 4.

Creating a Replica. The Setup algorithm generates a replica via the Seal operation and a proof that it was correctly generated. The prover generates the replica and sends the outputs (excluding R) to the verifier.

Setup
 inputs:
  prover key pair ($pk_P$; $sk_P$)
  prover SEAL key $pk_{SEAL}$
  data D
 outputs: replica R, Merkle root rt of R, proof SEAL Proving Storage. The Prove algorithm generates a proof of storage for the replica. The prover receives a random challenge, c, from the verifier, which determines a specific leaf Rc in the Merkle tree of R with root rt; the prover generates a proof of knowledge about $R_c$ and its Merkle path leading up to rt.

Prove
 inputs:
  prover Proof-of-Storage key $pk_{POS}$
  replica R
  random challenge c
 outputs: a proof $\pi_{POS}$ Verifying the Proofs. The Verify operation checks the validity of the proofs of storage given the Merkle root of the replica and the hash of the original data. Proofs are publicly verifiable: nodes in the distributed system maintaining the ledger and clients interested in particular data can verify these proofs.

Verify
 inputs:
  prover public key, $pk_P$
  verifier SEAL and POS keys $vk_{SEAL}$, $vk_{POS}$
  hash of data D, $h_D$
  Merkle root of replica R, rt
  random challenge, c
  tuple of proofs, ($\pi_{SEAL}$; $\pi_{POS}$)
 outputs: bit b, equals 1 if proofs are valid Practical PoSt Construction This section describes the construction of the PoSt protocol. A simplified protocol sketch is shown in FIG. 4. In one embodiment, the Setup and Verify operations are equivalent to those in the PoRep construction.

Proving space and time. The Prove algorithm generates a Proof-of-Spacetime for the replica. The prover receives a random challenge from the verifier and generates Proofs-of-Replication in sequence, using the output of a proof as an input of the challenge generation engine for a specified amount of iterations t (see FIG. 3).

Prove
 inputs:
  prover PoSt key $pk_{POST}$
  replica R
  random challenge c
  time parameter t
 outputs: a proof $\pi_{POST}$ Usage in Filecoin The Filecoin protocol can employ Proof-of-Spacetime to audit the storage offered by miners. To use PoSt in Filecoin, the scheme can be modified to be non-interactive. In a standard setting there is a prover and a verifier and the verifier sends challenges to the prover. in the filecoin setting, the prover can take challenges from the blockchain, so in such an embodiment the prover does not need to interact with the verifier (a non-interactive approach). Challenges can be generated using randomness from the blockchain.

FIG. 4 illustrates examples of proof-of-replication and proof-of-spacetime protocols. Here CRH denotes a collision-resistant hash, x is the NP-statement to be proven, and w is the witness.

Filecoin: A DSN Construction

The Filecoin DSN is a decentralized storage network that is auditable, publicly verifiable and designed on incentives. Clients pay a network of miners for data storage and retrieval; miners offer disk space and bandwidth in exchange for awards. Miners receive their awards only if the network can audit that their service was correctly provided.

In this section, the specification describes the Filecoin DSN construction, based on the DSN definition and Proof-of-Spacetime.

Setting

Participants

Any user can participate as a Client, a Storage Miner, and/or a Retrieval Miner in the Filecoin DSN.

Clients pay to store data and to retrieve data in the DSN, via Put and Get requests. Storage Miners provide data storage to the network. Storage Miners participate in Filecoin by offering their disk space and serving Put requests. To become Storage Miners, users pledge their storage by depositing collateral proportional to it.

Storage Miners respond to Put requests by committing to store the client's data for a specified time. Storage Miners generate Proofs-of-Spacetime and submit them to the blockchain to prove to the Network that they are storing the data through time. In case of invalid or missing proofs, Storage Miners can be penalized and loose part of their collateral. Storage Miners are also eligible to mine new blocks, and in doing so they receive a mining reward for creating a block and transaction fees for the transactions included in the block.

Retrieval Miners provide data retrieval to the Network. Retrieval Miners participate in Filecoin by serving data that users request via a Get request. Unlike Storage Miners, in one embodiment they are not required to pledge, commit to store data, or provide proofs of storage. It is natural for Storage Miners to also participate as Retrieval Miners. Retrieval Miners can obtain pieces directly from clients, or from the Retrieval Market.

The Network, N

In one embodiment, the system can personify all the users that run Filecoin full nodes as one single abstract entity: The Network. The Network acts as an intermediary that runs the Manage protocol; informally, at every new block in the Filecoin blockchain, full nodes manage the available storage, validate pledges, audit the storage proofs, and repair possible faults.

The Ledger

The Filecoin protocol is applied on top of a ledger-based token system, e.g., the Ledger, L. At any given time t (referred to as epoch), all users have access to $L_t$, the ledger at epoch t, which is a sequence of transactions. The ledger is append-only. The Filecoin DSN protocol can be implemented on ledgers that allows for the verification of Filecoin's proofs. In one embodiment, the protocol implements the ledger based on useful work.

The Markets

Demand and supply of storage meet at the two Filecoin markets/exchanges: Storage Market and Retrieval Market. The markets are two decentralized exchanges. Clients and miners set the prices for the services they request or provide by submitting orders to the respective markets. The exchanges provide a way for clients and miners to see matching orders and initiate deals. By running the Manage protocol, the Network guarantees rewards to miners and charges to clients if the service requested is successfully provided.

FIG. 5 illustrates an example of data structures in a decentralized storage network (DSN) scheme.

Data Structure

Pieces.

A piece is some part of data that a client is storing in the DSN. For example, data can be deliberately divided into many pieces and each piece can be stored by a different set of Storage Miners.

Sectors.

A sector is some disk space that a Storage Miner provides to the network. Miners store pieces from clients in their sectors and earn tokens for their services. In order to store pieces, Storage Miners must pledge their sectors to the network.

AllocationTable.

The AllocTable is a data structure that keeps track of pieces and their assigned sectors. The AllocTable is updated at every block in the ledger and its Merkle root is stored in the latest block. In practice, the table is used to keep the state of the DSN, allowing for quick look-ups during proof verification. For more details, see FIG. 5, which illustrates an example of data structures in a decentralized storage network (DSN) scheme.

Orders.

An order is a statement of intent to request or offer a service. Clients submit bid orders to the markets to request a service (resp. Storage Market for storing data and Retrieval Market for retrieving data) and Miners submit ask orders to offer a service. The order data structures are shown in FIG. 10.

Orderbook.

Orderbooks are sets of orders.

Pledge.

A pledge is a commitment to offer storage (specifically a sector) to the network. Storage Miners submit their pledge to the ledger in order to start accepting orders in the Storage Market. A pledge consists of the size of the pledged sector and the collateral deposited by the Storage Miner.

FIG. 6 illustrates an example execution of a Filecoin DSN, grouped by party and sorted chronologically by row.

Protocol

The clients, the Network, and the miners of the Filecoin DSN perform various operations. For example, the operations include the methods of the Get and the Put protocol an example of which is shown in FIG. 7 and the Manage protocol an example of which is shown in FIG. 8. An example protocol execution is shown in FIG. 6. An example of an overall Filecoin Protocol is shown in FIG. 1B.

Client Cycle

In one embodiment, the client can perform operations storing data in Filecoin DSN and retrieving data from the Filecoin DSN.

1. Put: Client stores data in Filecoin.

Clients can store their data by paying Storage Miners in Filecoin tokens. The Put protocol is described below.

A client initiates the Put protocol by submitting a bid order to the Storage Market orderbook (by submitting its order to the blockchain). When a matching ask order from miners is found, the client sends the piece of data to the miner. Both parties sign a deal order and submit it to the Storage Market orderbook.

Clients should be able to decide the amount of physical replicas of their pieces either by submitting multiple orders (or specifying a replication factor in the order). Higher redundancy results in a higher tolerance of storage faults.

2. Get: Client retrieves data from Filecoin.

Clients can retrieve any data stored in the DSN by awarding Retrieval Miners in Filecoin tokens. The Get protocol is described below.

A client initiates the Get protocol by submitting a bid order to the Retrieval Market orderbook (by gossiping their order to the network). When a matching ask order from miners is found, the client receives the piece from the miner. When received, both parties sign a deal order and submit it to the blockchain to confirm that the exchange succeeded.

Mining Cycle (for Storage Miners)

1. Pledge: Storage Miners pledge to provide storage to the Network.

Storage Miners pledge their storage to the network by depositing collateral via a pledge transaction in the blockchain, via Manage:PledgeSector. Storage miners deposit collateral for the time intended to provide the service, and the collateral is returned if the miner generates proofs of storage for the data the miner commit to store. If some proofs of storage fail, a proportional amount of collateral is lost.

Once the pledge transaction appears in the blockchain, miners can offer their storage in the Storage Market: a storage miner can set its price and add an ask order to the market's orderbook.

Manage:PledgeSector
inputs:
    current allocation table allocTable
    pledge request pledge
outputs: allocTable'

2. Receive Orders: Storage Miners get storage requests from the Storage Market.

Once the pledge transaction appears in the blockchain (e.g., in the AllocTable), miners can offer their storage in the Storage Market: a storage miner can set its price and add an ask order to the market's orderbook via Put:AddOrders.

Put:AddOrders
inputs: list of orders $O^1 \ldots O^n$
outputs: bit b, equals 1 if successful Check if ask orders are matched with a corresponding bid order from a client, via Put:MatchOrders.

Put:MatchOrders
inputs:
    the current Storage Market OrderBook
    query order to match $O^q$
outputs: matching orders $O^1 \ldots O^n$ Once orders are matched, clients send their data to the Storage Miners. When receiving the piece, miners run Put:ReceivePiece. When the data is received, both the miner and the client sign a deal order and submit it to the blockchain.

Put:ReceivePiece
inputs:
    signing key for $M_j$.
    current orderbook OrderBook
    ask order $O_{ask}$
    bid order $O_{bid}$
    piece p
outputs: deal order $O_{deal}$ signed by $C_i$ and $M_j$ 3. Seal: Storage Miners prepare the pieces for future proofs.

Storage Miners' storage is divided in sectors, each sector contains pieces assigned to the miner. The Network keeps track of each Storage Miners' sector via the allocation table. When a Storage Miner sector is filled, the sector is sealed. Sealing is a slow, sequential operation that transforms the data in a sector into a replica, a unique physical copy of the data that is associated to the public key of the Storage Miner. Sealing is a necessary operation during the Proof-of-Replication as described in Section 3.4.

Manage:Seal Sector
inputs:
    miner public/private key pair M
    sector index j
    allocation table allocTable
outputs: a proof $\pi_{SEAL}$, a root hash rt 4. Prove: Storage Miners prove they are storing the committed pieces.

When Storage Miners are assigned data, they must repeatedly generate proofs of replication to guarantee they are storing the data (for more details, see Section 3). Proofs are posted on the blockchain and the Network verifies them.

Manage:ProveSector
inputs:
    miner public/private key pair M
    sector index j
    challenge c
outputs: a proof $\pi_{POS}$ Mining Cycle (for Retrieval Miners)

In one embodiment, the retrieval miners can perform operations including receiving orders and sending pieces to clients.

1. Receive Orders: Retrieval Miners get data requests from the Retrieval Market.

Retrieval Miners announce their pieces by gossiping their ask orders to the network: A Retrieval Miner set its price and adds an ask order to the market's orderbook.

Get:AddOrders
inputs: list of orders $O_1 \ldots O_n$
outputs: none

Then, the Retrieval Miner checks if its orders are matched with a corresponding bid order from a client.

Get:MatchOrders
inputs:
    the current Retrieval Market OrderBook
    query order to match $O^q$
outputs: matching orders $O^1 \ldots O^n$ 2. Send: Retrieval Miners send pieces to the client.

Once orders are matched, Retrieval Miners send the requested piece to the client. When the client receives the piece, both the miner and the client sign a deal order for the requested piece of data and submit the signed deal orderto the blockchain.

Put:SendPiece
inputs:
    an ask order $O_{ask}$
    a bid order $O_{bid}$
    a piece p
outputs: a deal order "Odeal: signed by $M_i$ Network Cycle In one embodiment, the network can perform operations including assigning clients' pieces to storage miners and repairing network faults.

1. Assign: The Network assigns clients' pieces to Storage Miners' sectors.

Clients initiate the Put protocol by submitting a bid order in the Storage Market. When ask and bid orders match, the involved parties jointly commit to the exchange and submit a deal order in the market. At this point, the Network assigns the data to the miner and makes a note of it in the allocation table.

Manage:AssignOrders
  inputs:
    deal orders $O^1$deal ... $O^n$deal
    allocation table allocTable
  outputs: updated allocation table allocTable'

2. Repair: The Network finds faults and attempt to repair them.

All the storage allocations are public to participants in the network. At a block, the Network checks if the required proofs for each assignment are present, checks that they are valid, and acts accordingly:
  if any proof is missing or invalid, the network penalizes the Storage Miners by taking part of their collateral,
  if a large amount of proofs are missing or invalid (defined by a system parameter fault), the network considers the Storage Miner faulty, settles the order as failed and reintroduces a new order for the same piece into the market,
  if every Storage Miner storing this piece is faulty, then the piece is lost and the client gets refunded.

Manage:RepairOrders
  inputs:
    current time t
    current ledger L
    table of storage allocations allocTable
  outputs: orders to repair $O^1$deal ... $O^n$deal, updated allocation table allocTable Guarantees The following are the intuitions on how the Filecoin DSN achieves integrity, retrievability, public verifiability and incentive-compatibility.
  Achieving Integrity: Pieces can be named after their cryptographic hash. After a Put request, clients only need to store this hash to retrieve the data via Get and to verify the integrity of the content received.
  Achieving Retrievability: In a Put request, clients specify the replication factor and the type of erasure coding desired, specifying the storage as (f, m)-tolerant. The assumption is that given m Storage Miners storing the data, a maximum of f faults are tolerated. By storing data in more than one Storage Miner, a client can increase the chances of recovery, in case Storage Miners go offline or disappear.
  Achieving Public Verifiability and Auditability: Storage Miners submit their proofs of storage ($\pi_{SEAL}$, $\pi_{POST}$) to the blockchain. Any user in the network can verify the validity of these proofs, without having access to the outsourced data. Since the proofs are stored on the blockchain, they are a trace of operation that can be audited at any time.
  Achieving Incentive Compatibility: Informally, miners are rewarded for the storage they are providing. When miners commit to store some data, then they can generate proofs. Miners that skip proofs are penalized (by losing part of their collateral) and not rewarded for their storage.
  Achieving Confidentiality: Clients that desire for their data to be stored privately, can encrypt their data before submitting them to the network.

FIG. 7 illustrates examples of the put and get protocols in a Filecoin DSN.

FIG. 8 illustrates example of the manage protocol in a Filecoin DSN.

FIG. 9 illustrates an example generic protocol for a verifiable market/exchange.

Filecoin Storage and Retrieval Markets

Filecoin has two markets: the Storage Market and the Retrieval Market. The two markets have the same structure but different design. The Storage Market allows Clients to reward Storage Miners to store data. The Retrieval Market allows Clients to retrieve data by rewarding Retrieval Miners to deliver the data. In both cases, clients and miners can set their offer and demand prices or accept current offers. The exchanges are run by the Network—a personification of the network of full nodes in Filecoin. The network provides for miners to be rewarded by a client when providing a service to the client.

Verifiable Markets

Exchange Markets are protocols that facilitate exchange of a specific good or service. They do this by enabling buyers and sellers to conduct transactions. In the Filecoin DSN, exchanges are verifiable: a decentralized network of participants are able to verify the exchange between buyers and sellers.

In one embodiment, in Verifiable Markets, where no single entity governs an exchange, transactions are transparent, and anybody can participate pseudonymously. Verifiable Market protocols operate the exchange of goods/services in a decentralized fashion: consistency of the orderbooks, orders settlements and correct execution of services are independently verified via the participants—miners and full nodes in the case of Filecoin. For example, verifiable markets can have the following construction:

A verifiable Market is a protocol with two phases: order matching and settlement. Orders are statements of intent to buy or sell a security, good or service and the orderbook is the list of all the available orders.

Storage Market

The Storage Market is a verifiable market which allows clients (i.e. buyers) to request storage for their data and Storage Miners (i.e. sellers) to order their storage. In one embodiment, the Storage Market protocol includes the following requirements:
  In-chain orderbook: (1) Storage Miners orders are public, so that the lowest price is known to the network and clients can make informed decision on their orders, (2) client orders are submitted to the orderbook, even when they accept the lowest price.
  Participants committing their resources: both parties commit to their resources as a way to avoid disservice, to avoid a Storage Miner not providing a service it offers, and to avoid clients not having funds available to award a Storage Miner upon the Storage Miner's completion of the promised service. In order to participate to the Storage Market, a Storage Miner pledges collateral, depositing an amount of collateral proportional to its amount of proposed storage in the DSN. In this way, the Network can incentivize a Storage Miner to provide proofs of storage for the pieces it committed to store. Similarly, clients must deposit the awards specified in the order, ensuring availability of funds during settlement.
  Self-organization to handle faults: In one embodiment, orders are settled if Storage Miners have repeatedly proved that they have stored the pieces for the duration of the agreed-upon time period. The Network can verify the existence and the correctness of these proofs and act according to the rules outlined in the Repair description provided above.

FIG. 10 illustrates an example of orders data structures for retrieval and storage markets/exchanges.

Data Structures

Put Orders. There are three types of orders: bid orders, ask orders and deal orders. Storage Miners create ask orders to add storage, clients create bid orders to request storage, when both parties agree on a price, they jointly create a deal order. The data structures of the orders are shown in detail in FIG. 10, and the parameters of the orders are explicitly defined. Put Orderbook. The Orderbook in the Storage Market is the set of currently valid and open ask, bid and deal orders. Users can interact with the orderbook via the methods defined in the Put protocol: AddOrders, MatchOrders as described in FIG. 7.

The orderbook is public and honest users has the same view of the orderbook. At every epoch, new orders are added to the orderbook if new order transactions (txorder) appear in new blockchain blocks; orders are removed if they are cancelled, expired or settled. Orders are added in blockchain blocks, hence in the orderbook, if they are valid:

One embodiment defines the validity of bid, ask, deal orders as follows:

(Valid bid order): A bid order from client $C_i$, $O_{bid}$:=<size, funds[, price, time, coll, coding]>$C_i$ is valid if:
  Ci has at least the amount of funds available in their account.
  time is not set in the past
  The order guarantees at least a minimum amount of epochs of storage.

(Valid ask order): An ask order from Storage Miner $M_i$, $O_{ask}$:=<space, price>$_{Mi}$ is valid if:
  Mi has pledged to be a miner and the pledge will not expire before time epochs.
  space must be less than Mi's available storage: Mi pledged storage minus the storage committed in the orderbook (in ask and deal orders).

(Valid deal order): A deal order $O_{deal}$:=<ask, bid, ts>$_{Ci, Mj}$ is valid if
  ask references an order Oask such that: it is in the Storage Market OrderBook, no other deal orders in the Storage Market OrderBook mention it, it is signed by Ci.
  bid references an order Obid such that: it is in the Storage Market OrderBook, no other deal orders in the Storage Market OrderBook mention it, it is signed by Mj.
  ts is not set in the future or too far (e.g., more than 30 minutes to an hour) in the past.

If a malicious client receives a signed deal from a Storage Miner, but never adds it to the orderbook, then the Storage Miner cannot re-use the storage committed in the deal. The field ts prevents this attack because, after ts, the order becomes invalid and cannot be submitted in the orderbook.

FIG. 11 illustrates an example of a detailed storage market/exchange protocol. the Storage Market protocol is divided in two phases: order matching and settlement:

The Storage Market Protocol

With reference to FIG. 11, one embodiment of the Storage Market protocol is divided in two phases: order matching and settlement:

Order Matching: Clients and Storage Miners submit their orders to the orderbook by submitting a transaction to the blockchain (step 1). When orders are matched, the client sends the piece to the Storage Miner and both parties sign a deal order and submit it to the orderbook (step 2).

Settlement: Storage Miners seal their sectors (step 3a), generate proofs of storage for the sector containing the piece and submit them to the blockchain regularly (step 3b); meanwhile, the rest of the network must verify the proofs generated by the miners and repair possible faults (step 3c).

The Storage Market protocol is explained in detail in FIG. 11.

FIG. 12 illustrates an example of a detailed retrieval market/exchange protocol.

With reference to FIG. 13, the Retrieval Market protocol is divided in two phases: order matching and settlement:

Order Matching: Clients and Retrieval Miners submit their orders to the orderbook by gossiping their orders (step 1). When orders are matched, the client and the Retrieval Miners establish a micropayment channel (step 2).

Settlement: Retrieval Miners send a small parts of the piece to the client and for each piece the client sends to the miner a signed receipt (step 3). The Retrieval Miner presents the delivery receipts to the blockchain to get their rewards (step 4).

Useful Work Consensus

FIG. 13 illustrates an example of a leader election process via an expected consensus protocol. More generally, the Filecoin DSN protocol can be implemented on top of any consensus protocol that allows for verification of the Filecoin's proofs. In one embodiment, a consensus protocol is implemented based on useful work. Instead of using a wasteful Proof-of-Work computation, miners can utilize useful Proof-of-Spacetime work to participate in a consensus protocol.

Useful Work.

For example, work done by the miners in a consensus protocol is useful if the outcome of the computation is valuable to the network, beyond securing the blockchain.

Motivation

While securing the blockchain is a significant consideration, Proof-of-Work schemes often require solving puzzles whose solutions are not reusable or require a substantial amount of wasteful computation to find.

Non-reusable Work: Most permissionless blockchains require miners to solve a hard computational puzzle, such as inverting a hash function. Often the solutions to such a puzzle is useless and does not have any inherent value beyond securing the network.

Attempts to re-use work: There have been several attempts to re-use mining power for useful computation. Some efforts require miners to perform a special computation alongside the standard Proof-of-Work. Other efforts replace Proof-of-Work with useful problems that are still hard to solve. Although some of these efforts perform some useful work, these efforts all still include a significant portion of wasteful work.

Wasteful Work: Solving hard puzzles can be really expensive in terms of cost of machinery and energy consumed, especially if the puzzles involved rely heavily on computational power. When the mining algorithm is embarrassingly parallel, then the prevalent factor to solve the puzzle is computational power.

Attempts to reduce waste: Ideally, the majority of a network's resources should be spent on useful work. Some efforts require miners to use more energy-efficient solutions. Some efforts replace hard to solve puzzles with a traditional byzantine agreement based on Proof-of-Stake, where stakeholders vote on the next block proportional to their share of tokens in the system.

One embodiment of a consensus protocol utilizes useful work based on storing a client data.

Filecoin Consensus

In one embodiment of a useful work consensus protocol, the probability that the network elects a miner to create a new block (e.g, the voting power of the miner) is proportional to its storage currently in use in relation to the rest of the network. The design of the Filecoin protocol is such that miners would rather invest in storage than in computing power to parallelize the mining computation. Miners offer storage and re-use the computation for proof that data is being stored to participate in the consensus.

Modeling Mining Power

Power Fault Tolerance. Power Fault Tolerance is an abstraction that re-frames byzantine faults in terms of participants' influence over the outcome of the protocol. Every participant controls some power of which n is the total power in the network, and f is the fraction of power controlled by faulty or adversarial participants.

Power in Filecoin. In one embodiment of Filecoin, the power $p^t_i$ of miner $M_i$ at time t is the sum of the Mi's storage assignments. The influence $I^t_i$ of $M_i$ is the fraction of $M_i$'s power over the total power in the network.

In one embodiment of Filecoin, power has the following properties:
  Public: The total amount of storage currently in use in the network is public. By reading the blockchain, anyone can calculate the storage assignments of each miner—hence anyone can calculate the power of each miner and the total amount of power at any point in time.
  Publicly verifiable: For each storage assignment, miners generate Proofs-of-Spacetime, proving that the service is being provided. By reading the blockchain, anyone can verify if the power claimed by a miner is correct.
  Variable: At any point in time, miners can add new storage in the network by pledging with a new sector and filling the sector. In this way, a miner can change the amount of power it has through time.

Accounting for Power with Proof-of-Spacetime

In one embodiment, every $\Delta_{proof}$ blocks, the protocol asks miners to submit Proofs-of-Spacetime to the network, which are only successfully added to the blockchain if the majority of power in the network considers them valid. At every block, every full node updates the AllocTable, adding new storage assignments, removing expiring ones and marking missing proofs.

In one embodiment, the power of a miner Mi can be calculated and verified by summing the entries in the Alloc-Table, which can be done in at least two ways:
  Full Node Verification: If a node has the full blockchain log, run the NetworkProtocol from the genesis block to the current block and read the AllocTable for miner Mi. This process verifies every Proof-of-Spacetime for the storage currently assigned to Mi.
  Simple Storage Verification: Assume a light client has access to a trusted source that broadcasts the latest block. A light client is a client that doesn't have access to the entire blockchain, instead it only has access to the hash of the latest block from a trusted source and a way to request block headers from the network. A light client can request from nodes in the network: (1) the current AllocTable entry for miner Mi, (2) a Merkle path that proves that the entry was included in the state tree of the last block, (3) the headers from the genesis block until the current block. In this way, the light client can delegate the verification of the Proof-of-Spacetime to the network.

The security of the power calculation comes from the security of Proof-of-Spacetime. In this setting, PoSt ensures that the miner cannot lie about the amount of assigned storage they have. Indeed, a miner cannot claim to store more than the data it is storing, since this would require spending time fetching and running the slow PoSt:Setup, and such a miner cannot generate proofs faster by parallelizing the computation, since PoSt:Prove is a sequential computation.

Using Power to Achieve Consensus

In one embodiment, the Filecoin consensus extends Proof-of-Stake consensus protocols, where stake is replaced with assigned storage. For example, the Filecoin consensus can be implemented using Expected Consensus. In one embodiment, Expected Consensus elects, at every round, one (or more) miners where the probability of a miner winning an election is proportional to that miner's assigned storage.

Expected Consensus.

The basic intuition of Expected Consensus (EC) is to deterministically, unpredictably, and secretly elect a small set of leaders (e.g., 1-4) at each epoch. On expectation, the number of elected leaders per epoch is 1, but some epochs may have zero or many leaders. Leaders extend the chain by creating a block and propagating it to the network. At each epoch, the chain is extended with one or multiple blocks. In one embodiment, each leader can add one block. In case of a leaderless epoch, an empty block is added to the chain. Although the blocks in chain can be linearly ordered, the block chain's data structure can be a direct acyclic graph. EC is a probabilistic consensus, where each epoch introduces more certainty over previous blocks, eventually reaching enough certainty that the likelihood of a different history is sufficiently small. A block is committed if the majority of the participants add their weight on the chain where the block belongs to, by extending the chain or by signing blocks.

Electing Miners. At every epoch, each miner checks if they are elected leader, this is done similarly to existing consensus protocols:

(EC Election in Filecoin) A miner Mi is a leader at time t if the following condition is met:

$$\mathcal{H}(\langle t \| rand(t) \rangle_{Mi})/2^L \le \frac{p^t_i}{\sum_j p^t_j}$$

Where rand(t) is a function that extracts randomness from the blockchain at epoch t, $p^t_i$ is the power of M. Consider the size of H(m) to be L for any m, H to be a secure cryptographic hash function and $\langle m \rangle_{Mi}$ to be a message m signed by $M_i$, such that:

$$\langle m \rangle_{Mi} := ((m), SIG_{Mi}(H(m)))$$

FIG. 13 further shows the protocol between a miner (ProveElect) and a network node (VerifyElect).

This election scheme provides three properties: fairness, secrecy and public verifiability.
  Fairness: each participant has only one trial for each election, since signatures are deterministic and t and rand(t) are fixed. Assuming H is a secure cryptographic hash function, then $$\mathcal{H}(\langle t \| rand(t) \rangle_{Mi})/2^L$$

must be a real number uniformly chosen from (0, 1). Hence, the probability for the equation to be true must be $$\frac{p_i^t}{\sum_j p_j^t},$$

which is equal to the miner's portion of power within the network. Because this probability is linear in power, this likelihood is preserved under splitting or pooling power. Note that the random value rand(t) is not known before time t.

Secret: an efficient adversary that does not own the secret key Mi can compute the signature with negligible probability, given the assumptions of digital signatures.

Public Verifiability: an elected leader i$\Box$L$^t$ can convince an efficient verifier by showing t, rand(t), H($\langle$t$\|$rand(t)$\rangle_i$)/2$^L$; given the previous point, no efficient adversary can generate a proof without having a winning secret key.

Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
   receiving a final proof from a prover, the prover:
      receiving client data from a client;
      storing the received client data using prover-accessible storage that is not publicly accessible;
      receiving an initial input challenge, the initial input challenge having a start time time-stamp indicating the start time;
      producing an initial proof responsive to the initial input challenge, the initial proof proving that the prover is storing the received client data;
      generating a new input challenge based at least in part on the initial proof;
      producing a new proof responsive to the new input challenge, the new proof proving that the prover is storing the received client data; and
      repeating the generating step and the producing a new proof step a number of times, wherein each generating step is based at least in part on a most recent new proof, to produce a final proof proving the storage of the received client data over time, wherein the received client data is stored using prover-accessible storage that is not publicly accessible;
   receiving the final proof, the final proof having a final-proof time-stamp indicating the time the final proof is received;
   determining that the time between the start time time-stamp and the final proof time-stamp is less than a specified period of time;
   determining a winning prover from a plurality of candidate provers where a probability of a candidate prover being a winning prover is proportional to the candidate prover's assigned storage indicated at least in part by a candidate miner's final proof proving the storage of the received client data during the time between the start time and the final proof time;
   receiving a new block from the winning prover; and
   adding the new block to a blockchain-based file storage system.

2. The method of claim 1 wherein the final proof is based at least in part on the most-recent in time verification of an amount of data a candidate miner has been storing.

3. The method of claim 1 wherein the proof result is based at least in part on a set of proofs of storage.

4. The method of claim 1 wherein the final proof is based on useful work.

5. The method of claim 4 wherein the useful work is storage of data.

6. The method of claim 1 wherein the method further comprises
   (a) receiving at a prover original data from a client for storage by a prover;
   (b) receiving at the prover a challenge from a verifier; and
   (c) receiving a proof result from the prover indicating that the original data has been stored by the prover at least through a specified period of time.

7. The method of claim 6 wherein the verifier is the client.

8. A method comprising:
   receiving a final proof from a miner, the miner:
      receiving client data from a client;
      storing the received client data using miner-accessible storage that is not publicly accessible;
      receiving an initial input challenge at a start time, the initial input challenge having a start time time-stamp indicating the start time;
      producing an initial proof responsive to the initial input challenge, the initial proof proving that the miner is storing the received client data;
      generating a new input challenge based at least in part on the initial proof;
      producing a new proof responsive to the new input challenge, the new proof proving that the miner is storing the received client data; and
      repeating the generating step and the producing a new proof step a specified number of times wherein each generating step is based at least in part on a most recent new proof, to produce a final proof at a final proof time, the final proof proving the storage of the received client data over time, wherein the received client data is stored using miner-accessible storage that is not publicly accessible;

receiving the final proof from the miner, the final proof having a final proof time-stamp indicating the time the final proof is received;

determining that the time between the start time time-stamp and the final proof time-stamp is less than a specified period of time;

electing a miner from the plurality of candidate miners at a specified point in time where the probability of winning the election by a candidate miner is proportional to the candidate miner's assigned storage which is indicated at least in part by a candidate miner's final proof proving the storage of the received client data during the time between the start time time-stamp and the final proof time-stamp;

receiving a new block from the elected miner; and adding the new block to a blockchain-based file storage system.

9. The method of claim 8 wherein the final proof is based at least in part on the most-recent in time verification of an amount of data a candidate miner has been storing.

10. The method of claim 8 wherein the final proof is based at least in part on a set of proofs of storage.

11. The method of claim 8 wherein the final proof is based on useful work.

12. The method of claim 11 wherein the useful work is storage of data.

13. The method of claim 8 wherein the method further comprises receiving at a miner original data from a client for storage by a miner;

receiving at the miner a challenge from a verifier; and receiving a proof result from the miner indicating that the original data has been stored by the miner at least through a specified period of time.

14. The method of claim 13 wherein the verifier is the client.

15. A system comprising:

one or more computers and one or more storage devices on which are stored instructions that are operable, when executed by the one or more computers, to cause the one or more computers to perform operations comprising:

receiving a final proof from a prover, the prover:

receiving client data from a client;

storing the received client data using prover-accessible storage that is not publicly accessible;

receiving an initial input challenge at a start time, the initial input challenge having a time-stamp indicating the start time;

producing an initial proof responsive to the initial input challenge, the initial proof proving that the prover is storing the received client data;

generating at the prover a new input challenge based at least in part on the initial proof;

producing a new proof responsive to the new input challenge, the new proof proving that the prover is storing the received client data; and repeating the generating step and the producing a new proof step a number of times, wherein each generating step is based at least in part on a most recent proof, to produce a final proof proving the storage of the received client data over time, wherein the received client data is stored using prover-accessible storage that is not publicly accessible;

receiving the final proof, the final proof having a final proof time-stamp indicating the time the proof result is received;

determining that the time between the start time time-stamp and the final proof time-stamp is less than a specified period of time;

determining a winning prover from a plurality of candidate provers where a probability of a candidate prover being a winning prover is proportional to the candidate prover's assigned storage which is indicated at least in part by a candidate miner's proof proving the storage of the received client data during the time between the start time and the final proof time;

receiving a new block from the winning prover; and adding the new block to a blockchain-based file storage system.

16. The method of claim 15 wherein the final proof is based at least in part on the most-recent in time verification of an amount of data a candidate prover has been storing.

17. The method of claim 15 wherein the final proof is based at least in part on a set of proofs of storage.

18. The method of claim 1 wherein the final proof is based on useful work and the useful work is storage of data.

* * * * *

UNITED STATES PATENT AND TRADEMARK OFFICE
CERTIFICATE OF CORRECTION

| | |
|---|---|
| PATENT NO. | : 10,708,071 B1 |
| APPLICATION NO. | : 16/195536 |
| DATED | : July 7, 2020 |
| INVENTOR(S) | : Nicola Greco, Juan Batiz-Benet and David Allen Dalrymple |

Page 1 of 1

It is certified that error appears in the above-identified patent and that said Letters Patent is hereby corrected as shown below:

In the Specification

Column 1, Line 7, delete "Application" and insert -- Applications --

Signed and Sealed this
Fifteenth Day of September, 2020

Andrei Iancu
*Director of the United States Patent and Trademark Office*